(12) United States Patent
Xu et al.

(10) Patent No.: US 11,252,251 B2
(45) Date of Patent: Feb. 15, 2022

(54) CACHE DATA REQUEST METHOD AND RELATED DEVICE

(71) Applicant: HUAWEI TECHNOLOGIES CO., LTD., Guangdong (CN)

(72) Inventors: Min Xu, Shenzhen (CN); Lingli Pang, Shanghai (CN); Xiaoxiao Zheng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 62 days.

(21) Appl. No.: 16/412,821

(22) Filed: May 15, 2019

(65) Prior Publication Data

US 2019/0268434 A1 Aug. 29, 2019

Related U.S. Application Data

(63) Continuation of application No. PCT/CN2016/106446, filed on Nov. 18, 2016.

(51) Int. Cl.
*H04L 29/08* (2006.01)
*H04W 76/14* (2018.01)
(Continued)

(52) U.S. Cl.
CPC ...... *H04L 67/2842* (2013.01); *H04L 67/2804* (2013.01); *H04L 67/2809* (2013.01);
(Continued)

(58) Field of Classification Search
CPC ............. H04L 67/2842; H04L 67/2804; H04L 67/2809; H04L 67/2847; H04L 67/289;
(Continued)

(56) References Cited

U.S. PATENT DOCUMENTS 8,843,160 B2 * 9/2014 Burckart ............... H04W 64/00
455/456.3
9,686,177 B2 6/2017 Frydman et al.
(Continued)

FOREIGN PATENT DOCUMENTS

CN 102143199 A 8/2011
CN 102904859 A 1/2013
(Continued)

*Primary Examiner* — Philip J Chea
*Assistant Examiner* — Robert B McAdams
(74) *Attorney, Agent, or Firm* — Womble Bond Dickinson (US) LLP

(57) ABSTRACT

Embodiments of the present disclosure provide a cache data obtaining method. After detecting a first request message specific to a target data server, a data request device determines, based on a pre-received local cache device list sent by a base station, a target local cache device used to cache service data of the target data server. Subsequently, the data request device establishes a network connection to the target local cache device, and sends a service data request specific to the target data server to the target local cache device by using the network connection. With data of the target data server cached to a local cache device on a base station side, the data request device can directly request the target service data from the target local cache device.

16 Claims, 12 Drawing Sheets

(51) Int. Cl.
*H04W 88/18* (2009.01)
*H04W 88/08* (2009.01)
*H04W 28/14* (2009.01)

(52) U.S. Cl.
CPC ........ *H04L 67/289* (2013.01); *H04L 67/2847* (2013.01); *H04W 28/14* (2013.01); *H04W 76/14* (2018.02); *H04W 88/08* (2013.01); *H04W 88/18* (2013.01)

(58) Field of Classification Search
CPC ..... H04W 76/14; H04W 28/14; H04W 88/08; H04W 88/18
See application file for complete search history.

(56) References Cited

U.S. PATENT DOCUMENTS

| | | | |
|---|---|---|---|
| 2008/0086574 A1 | 4/2008 | Raciborski et al. | |
| 2012/0218970 A1* | 8/2012 | Westberg | H04W 36/026 370/331 |
| 2012/0224578 A1* | 9/2012 | Mih Ly | H04L 12/4633 370/392 |
| 2013/0041982 A1* | 2/2013 | Shi | H04L 67/1089 709/217 |
| 2013/0188598 A1 | 7/2013 | Zakrzewski et al. | |
| 2014/0040346 A1 | 2/2014 | Yanagihara et al. | |
| 2014/0269482 A1* | 9/2014 | Pandey | G08B 25/08 370/312 |
| 2015/0365819 A1 | 12/2015 | Zhu et al. | |
| 2016/0309450 A1* | 10/2016 | Li | H04L 12/6418 |
| 2016/0337919 A1* | 11/2016 | Bindrim | H04L 67/289 |
| 2017/0006127 A1* | 1/2017 | Hishinuma | H04L 67/10 |
| 2017/0155734 A1* | 6/2017 | Zhang | G06Q 30/04 |

FOREIGN PATENT DOCUMENTS

| | | |
|---|---|---|
| CN | 103430516 A | 12/2013 |
| CN | 103703747 A | 4/2014 |
| CN | 103918245 A | 7/2014 |
| CN | 104092776 A | 10/2014 |
| CN | 104168317 A | 11/2014 |
| CN | 105791392 A | 7/2016 |
| EP | 2690818 A2 | 1/2014 |
| WO | 2015166680 A1 | 11/2015 |
| WO | 2018/090336 A1 | 5/2018 |

* cited by examiner

CACHE DATA REQUEST METHOD AND RELATED DEVICE

CROSS-REFERENCE TO RELATED APPLICATIONS

This application is a continuation of International Application No. PCT/CN2016/106446, filed on Nov. 18, 2016, the disclosure of which is hereby incorporated by reference in its entirety.

TECHNICAL FIELD

The present disclosure relates to the field of communications technologies, and in particular, to a cache data request method and a related device.

BACKGROUND

With increasing popularity of intelligent terminals and a large-scale increase in mobile devices, mobile data traffic explodes continuously. Tremendous explosion of network traffic easily causes problems such as network congestion, data redundancy transmission, and poor user experience. To alleviate excessive load on network infrastructure caused by explosion of content and traffic, a local cache, also referred to as a content sink, attracts great attention from the academic circle and the industry.

Currently, a relatively common cache manner is use of a content delivery network (CDN). The content delivery network is responsible for connecting a server and a user that are located at two ends of an entire bandwidth service chain, and publishing content of a website to a network edge that is closest to the user, so that the user can obtain required content in proximity, thereby alleviating Internet network congestion, and increasing a response speed of website access of the user. However, the CDN is currently deployed in a backbone network. User equipment (UE) can access the backbone network only after connecting to a radio network and a core network, and link transmission overheads and a transmission delay between the wireless network and the core network are relatively large. In addition, deployment of the CDN is relatively costly, and distributed storage, load balancing, network request redirection, content management, and the like need to be deployed. If the CDN is deployed in another network, overheads and investment costs are relatively high.

SUMMARY

The present disclosure provides a cache data request method and a related device, so that data transmission overheads and a transmission delay can be reduced while network congestion is alleviated, and a response speed of a data request device after a data request is increased.

A first aspect of the present disclosure provides a cache data request method. After detecting a first request message specific to a target data server, a data request device determines, based on a pre-received local cache device list sent by a base station, a target local cache device used to cache service data of the target data server. Subsequently, the data request device establishes a network connection to the target local cache device, and sends a service data request specific to the target data server to the target local cache device by using the network connection.

In the technical solution, with data of the target data server cached to a local cache device on a base station side, the data request device can directly request the target service data from the target local cache device. This avoids a waste of transmission overheads and a relatively large transmission delay that are caused by requesting data from the target data server, and therefore, a response speed of the data request device after the data request is increased, and user experience is improved.

In a first implementation of the first aspect, after establishing the network connection to the target local cache device, when detecting a first service data request whose target address is an address of the target data server, the data request device sends a second service data request to the target local cache device, where both the first service data request and the second service data request carry a target service data identifier, and the second service data request is used to instruct the target local cache device to send, when detecting that target service data corresponding to the target service data identifier has been cached, the cached target service data to the data request device.

In a second implementation of the first aspect, the first request message includes a target service data identifier, and is used to request target service data corresponding to the target service data identifier. Then, after the data request device establishes the network connection to the target local cache device, the data request device sends a second service data request to the target local cache device, where the second service data request carries the target service data identifier, and the second service data request is used to instruct the target local cache device to send, when detecting that the target service data corresponding to the target service data identifier has been cached, the cached target service data to the data request device.

With reference to any one of the first aspect and the first and the second implementation of the first aspect, in a third implementation of the first aspect, the local cache device list includes an identifier of at least one local cache device. The data request device determines whether a first identifier consistent with an identifier of a local cache device in the local cache device list exists in a pre-obtained cache content authorization list, where the cache content authorization list includes an identifier of at least one local cache device that is authorized by the target data server to perform caching; and if the first identifier exists in the cache content authorization list, the data request device determines that a local cache device corresponding to the first identifier is the target local cache device.

With reference to the third implementation of the first aspect, in a fourth implementation of the first aspect, before determining whether the first identifier consistent with the identifier of the at least one local cache device in the local cache device list exists in the pre-obtained cache content authorization list, the data request device receives the cache content authorization list sent by the target data server.

With reference to the third implementation of the first aspect, in a fifth implementation of the first aspect, the local cache device includes a base station to which the data request device belongs and/or at least one first cache device connected to the base station.

In a sixth implementation of the first aspect, the data request device sends a second request message to a base station to which the data request device belongs, where the second request message carries routing information, the routing information is used to indicate the target local cache device, and the second request message is used to instruct the base station to establish the connection between the data request device and the target local cache device.

With reference to the sixth implementation of the first aspect, in a seventh implementation of the first aspect, the routing information includes an identifier of the target local cache device or an index of the target local cache device.

With reference to any one of the first aspect and the first to the seventh implementations of the first aspect, in an eighth implementation of the first aspect, in a wireless to the x (WTTx) scenario, the data request device is a home gateway that is connected to user equipment, and the data request device receives a first service data request that is sent by the user equipment and whose target address is an address of the target data server.

A second aspect of the present disclosure provides another cache data request method. A base station sends a local cache device list to a data request device managed by the base station, where the local cache device list includes an identifier of at least one local cache device, and the local cache device list is used by the data request device to determine a target local cache device that is authorized to cache service data of the target data server.

In the technical solution, with data of the target data server cached to a local cache device on a base station side, the data request device can directly request the target service data from a local cache device in proximity. This avoids a waste of transmission overheads and a relatively large transmission delay that are caused by requesting data from the target data server, and therefore, a response speed of the data request device after the data request is increased, and user experience is improved.

In a first implementation of the second aspect, the base station receives a second request message sent by the data request device, where the second request message carries routing information, the routing information is used to indicate the target local cache device, and the base station establishes a connection between the data request device and the target local cache device based on the second request message.

With reference to the first implementation of the second aspect, in a second implementation of the second aspect, the base station establishes a transport bearer between the base station and the data request device and/or a transport bearer between the base station and the target local cache device, where the transport bearer is used to transmit data that is between the data request device and the target local cache device.

In a third implementation of the second aspect, the base station receives a second service data request that is sent by the data request device after establishing a network connection to the target local cache device and that is specific to the target local cache device, where the second service data request carries a target service data identifier; and when determining that the target local cache device has cached target service data corresponding to the target service data identifier, the base station sends the cached target service data to the data request device.

With reference to the third implementation of the second aspect, in a fourth implementation of the second aspect, the base station sends the second service data request to the target local cache device, receives the cached target service data that is sent by the target local cache device when detecting that the target service data has been cached, and then sends the cached target service data to the data request device.

With reference to the third implementation of the second aspect, in a fifth implementation of the second aspect, after receiving the second service data request that is sent by the data request device after establishing the network connection to the target local cache device and that is specific to the target local cache device, when determining that the target local cache device has not cached the target service data, the base station sends a third service data request to the target data server, where the third service data request carries the target service data identifier, and the third service data request is used to instruct the target data server to send the target service data to the data request device.

With reference to the fifth implementation of the second aspect, in a sixth implementation of the second aspect, the base station sends the second service data request to the target local cache device, where the second service data request is used to instruct the target local cache device to send, when detecting that the target service data has not been cached, information indicating non-cached specific to the target service data to the base station; and the base station receives the information indicating non-cached that is sent by the target local cache device and that is specific to the target service data, and determines that the target local cache device has not cached the target service data.

A third aspect of the present disclosure provides a data request device. The device includes a processor, a memory, and a communications interface. The processor is connected to the memory and the communications interface. For example, the processor may be connected to the memory and the communications interface by using a bus. The communications interface is configured to communicate with a device such as a base station. The memory is configured to store a local cache device list and the like. The processor is configured to perform some or all of the procedures of the first aspect.

A fourth aspect of the present disclosure provides another data request device, including:

a processing module, configured to: detect a first request message specific to a target data server; determine, based on a pre-received local cache device list sent by a base station, a target local cache device used to cache service data of the target data server; and establish a network connection to the target local cache device; and a sending module, configured to send a service data request specific to the target data server to the target local cache device by using the network connection.

In the technical solution, with data of the target data server cached to a local cache device on a base station side, the data request device can directly request the target service data from the target local cache device. This avoids a waste of transmission overheads and a relatively large transmission delay that are caused by requesting data from the target data server, and therefore, a response speed of the data request device after the data request is increased, and user experience is improved.

In a first implementation of the fourth aspect, the processing module is further configured to detect a first service data request whose target address is an address of the target data server, where the first service data request carries a target service data identifier; and the sending module is further configured to send a second service data request to the target local cache device, where the second service data request carries the target service data identifier, and the second service data request is used to instruct the target local cache device to send, when detecting that target service data corresponding to the target service data identifier has been cached, the cached target service data to the data request device; and the device further includes:

a receiving module, configured to receive the target service data sent by the target local cache device.

In a second implementation of the fourth aspect, the first request message includes a target service data identifier, and is used to request target service data corresponding to the target service data identifier;

the sending module is further configured to send a second service data request to the target local cache device, where the second service data request carries the target service data identifier, and the second service data request is used to instruct the target local cache device to send, when detecting that the target service data corresponding to the target service data identifier has been cached, the cached target service data to the data request device; and the device further includes:

a receiving module, configured to receive the target service data sent by the target local cache device.

With reference to any one of the fourth aspect and the first and the second implementation of the fourth aspect, in a third implementation of the fourth aspect, the local cache device list includes an identifier of at least one local cache device; and the processing module is configured to:

determine whether a first identifier consistent with an identifier of a local cache device in the local cache device list exists in a pre-obtained cache content authorization list, where the cache content authorization list includes an identifier of at least one local cache device that is authorized by the target data server to perform caching; and if the first identifier exists in the cache content authorization list, determine that a local cache device corresponding to the first identifier is the target local cache device.

With reference to the third implementation of the fourth aspect, in a fourth implementation of the fourth aspect, the receiving module is further configured to:

receive the cache content authorization list sent by the target data server.

With reference to the third implementation of the fourth aspect, in a fifth implementation of the fourth aspect, the local cache device includes a base station to which the data request device belongs and/or at least one first cache device connected to the base station.

In a sixth implementation of the fourth aspect, the processing module is configured to:

send a second request message to a base station to which the data request device belongs, where the second request message carries routing information, the routing information is used to indicate the target local cache device, and the second request message is used to instruct the base station to establish the connection or a bearer between the data request device and the target local cache device.

With reference to the sixth implementation of the fourth aspect, in a seventh implementation of the fourth aspect, the routing information includes an identifier of the target local cache device or an index of the target local cache device.

With reference to any one of the fourth aspect and the first to the seventh implementations of the fourth aspect, in an eighth implementation of the fourth aspect, the processing module is configured to:

receive a first service data request that is sent by user equipment and whose target address is the address of the target data server.

A fifth aspect of the present disclosure provides another data request device, where the device includes a processor, a transmitter, and a receiver. The data request device implements some or all of the methods of the first aspect by using the foregoing modules.

A sixth aspect of the present disclosure provides a base station. The base station includes a processor, a memory, and a communications interface. The processor is connected to the memory and the communications interface. For example, the processor may be connected to the memory and the communications interface by using a bus. The communications interface is configured to communicate with a device such as a data request device. The memory is configured to store a local cache device list and the like. The processor is configured to perform some or all of the procedures of the second aspect.

A seventh aspect of the present disclosure provides another base station, including:

a processing module, configured to obtain a local cache device list, where the local cache device list includes an identifier of at least one local cache device; and a sending module, configured to send the local cache device list to a data request device managed by the base station, where the local cache device list is used by the data request device to determine a target local cache device used to cache service data of the target data server.

In a first implementation of the seventh aspect, the base station further includes:

a receiving module, configured to receive a second request message sent by the data request device, where the second request message carries routing information, and the routing information is used to indicate the target local cache device; and the processing module is further configured to establish a connection or a bearer between the data request device and the target local cache device based on the second request message.

With reference to the first implementation of the seventh aspect, in a second implementation of the seventh aspect, the processing module is configured to:

establish a transport bearer between the base station and the data request device and/or a transport bearer between the base station and the target local cache device, where the transport bearer is used to transmit data that is between the data request device and the target local cache device.

In a third implementation of the seventh aspect, the base station further includes:

a receiving module, configured to receive a second service data request that is sent by the data request device after establishing a network connection to the target local cache device and that is specific to the target local cache device, where the second service data request carries a target service data identifier; and the processing module is further configured to send, when determining that the target local cache device has cached target service data corresponding to the target service data identifier, the cached target service data to the data request device.

With reference to the third implementation of the seventh aspect, in a fourth implementation of the seventh aspect, the processing module is configured to:

send the second service data request to the target local cache device;

receive the cached target service data that is sent by the target local cache device when detecting that the target service data has been cached; and send the cached target service data to the data request device.

With reference to the third implementation of the seventh aspect, in a fifth implementation of the seventh aspect, the processing module is further configured to:

when determining that the target local cache device has not cached the target service data, send a third service data request to the target data server, where the third service data request carries the target service data identifier, and the third service data request is used to instruct the target data server to send the target service data to the data request device.

With reference to the fifth implementation of the seventh aspect, in a sixth implementation of the seventh aspect, the processing module is configured to:

send the second service data request to the target local cache device, where the second service data request is used to instruct the target local cache device to send, when detecting that the target service data has not been cached, information indicating non-cached specific to the target service data to the base station; and receive the information indicating non-cached that is sent by the target local cache device and that is specific to the target service data, and determine that the target local cache device has not cached the target service data.

An eighth aspect of the present disclosure provides another base station, where the device includes a processor, a transmitter, and a receiver. The base station implements some or all of the methods of the second aspect by using the foregoing modules.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

FIG. 2b-1 and FIG. 2b-2 are a schematic flowchart of another cache data request method according to an embodiment of the present disclosure;

FIG. 3a-1 and FIG. 3a-2 are a schematic flowchart of still another cache data request method according to an embodiment of the present disclosure;

FIG. 3b-1 and FIG. 3b-2 are a schematic flowchart of yet another cache data request method according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

This section first describes some basic concepts in each embodiment of the present disclosure.

A base station in the embodiments of the present disclosure includes an evolved NodeB (eNB) in an Long Term Evolution LTE (LTE) system, or a network device in a future communications system, such as a network device (for example, a controller) in 5G.

In some implementation scenarios, a data request device in the embodiments of the present disclosure may be user equipment (UE) or a modem module, and includes a device that can access a network by using a base station, such as a mobile phone, a smartphone, a computer, a tablet computer, a mobile Internet device (MID), and a device that can access a network by using a base station, and a wearable device. In an applicable wireless to the x (WTTx) implementation scenario, the data request device may be Customer Premise Equipment (CPE), and the CPE may serve as a home gateway, and is used to provide integrated access to services such as broadband, internet protocol television (IPTV), and voice over internet protocol (VoIP) for home or enterprise or other customers. The CPE may be connected to home user equipment (UE) by using a wireless connection such as Wi-Fi, and then establishes a connection to the base station in a wireless access manner such as LTE or wideband code division multiple access (WCDMA), so that the home user equipment accesses a network by using the CPE, thereby reducing costs of wired network layout.

A local cache (LC) device in the embodiments of the present disclosure may be an independent cache server in some implementation scenarios, and is connected to a base station by using a local gateway (LGW). In some other implementation scenarios, the local cache device may be a part of the base station, for example, may be a cache device in the base station.

A data server in the embodiments of the present disclosure may be an over-the-top server that provides an application service for UE by using the Internet, or may be a Content Provider Server of an operator, or the like.

The embodiments of the present disclosure are applicable to a plurality of communications systems, such as an LTE system, a wireless to the x (WTTx) system, a fifth-generation communications system (5G), and a device-to-device (D2D) communications system.

Figure 1A:
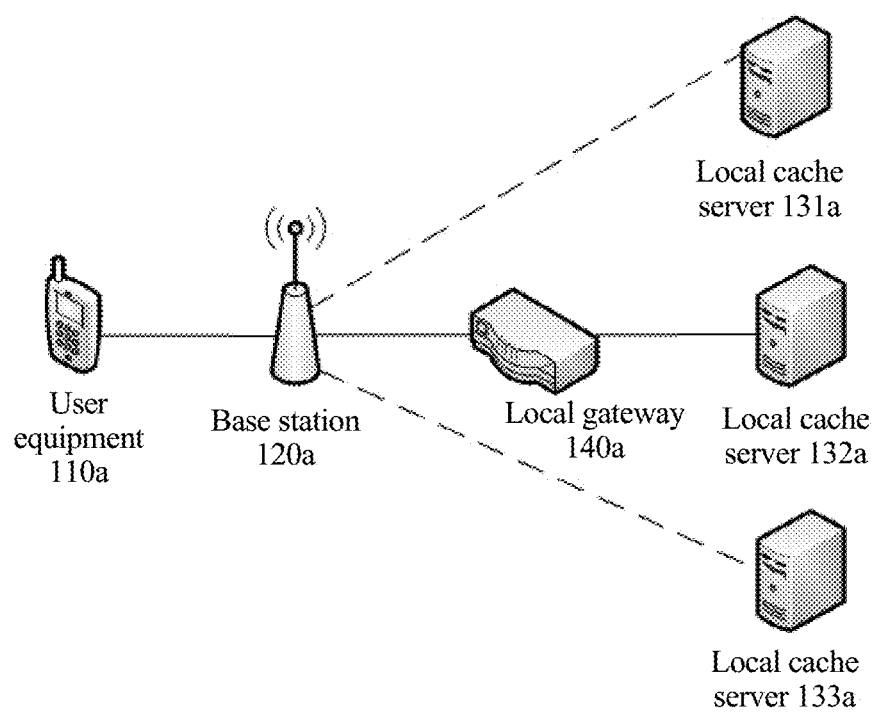
FIG. 1a is a system architectural diagram of a communications system according to an embodiment of the present disclosure.

FIG. 1a is a system architectural diagram of a communications system according to an embodiment of the present disclosure. The communications system includes user equipment 110a, a base station 120a, and at least one local cache device 131a, 132a, and 133a. The base station 120a may be connected to the local cache devices 131a, 132a, and 133a by using a local gateway 140a (LGW). In the system architectural diagram shown in FIG. 1a, one base station 120a may be connected to a plurality of local cache devices (131a, 132a, and 133a). That is, when different service data requested by the user equipment 110a corresponds to local caches respectively in the local cache devices 131a, 132a, and 133a, the user equipment 110a may separately send a corresponding service data request to the local cache devices 131a, 132a, and 133a by using the base station 120a.

Figure 1B:
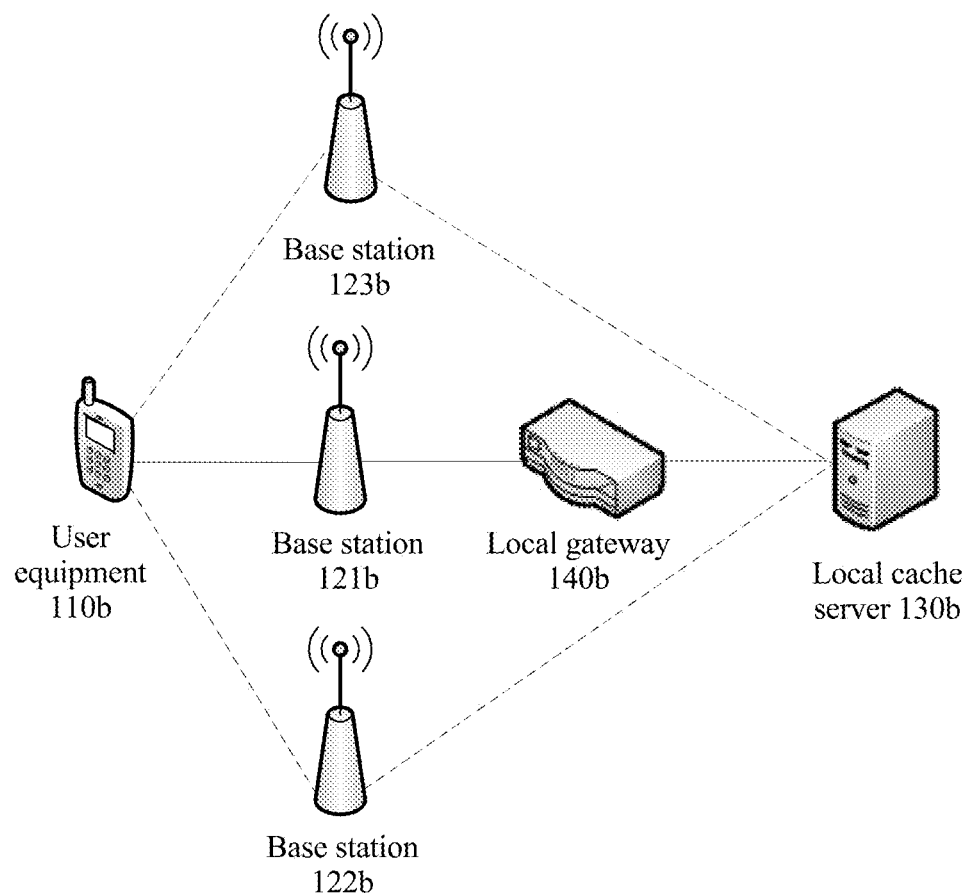
FIG. 1b is a system architectural diagram of another communications system according to an embodiment of the present disclosure.

FIG. 1b is a system architectural diagram of another communications system according to an embodiment of the present disclosure. The communications system includes user equipment 110b, a local cache device 130b, and at least one base station 121b, 122b, and 123b. Base stations (121b, 122b, and 123b) may be connected to the local cache device 130b by using a local gateway 140b. In the system architectural diagram shown in FIG. 1b, a plurality of base stations (121b, 122b, and 123b) may be connected to one local cache device 130b. When the user equipment 110b requests service data cached in the local cache device 130b, even when the user equipment 110b moves between the base stations 121b, 122b, and 123b, the user equipment 110b may obtain the same requested service data from the same local cache device 130b by using any of the base stations 121b, 122b, and 123b. In this way, service re-establishment during a handover to a base station can be avoided.

Further, the local cache device in FIG. 1a and FIG. 1b may also be a part of a base station. Therefore, user equipment does not need to connect to a local cache device by using a local gateway, and the user equipment may send only a service data request to the base station.

Figure 1C:
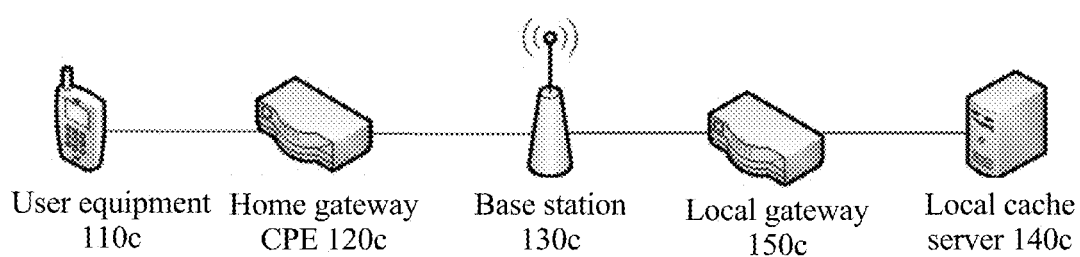
FIG. 1c is a system architectural diagram of still another communications system according to an embodiment of the present disclosure.

The technical solutions in the embodiments of the present disclosure are further applicable to a wireless to the x (WTTx) implementation scenario. For example, FIG. 1c is a system architectural diagram of another communications system according to an embodiment of the present disclosure. The communications system includes user equipment 110c, home gateway CPE 120c, a base station 130c, and a local cache device 140c. The base station 130c may be connected to the local cache device 140c by using a local gateway 150c. In the system architectural diagram shown in FIG. 1c, the user equipment 110c may request service data cached in the local cache device 140c from the home gateway CPE 120c, and the home gateway CPE 120c sends a corresponding service data request to the local cache device 140c by using the base station 130c.

Similar to the system architectures in FIG. 1a and FIG. 1b, a base station in a WTTx implementation scenario may be connected to a plurality of local cache devices, and a plurality of base stations may also be connected to a same local cache device. Further, a local cache device may also be a part of a base station. Therefore, user equipment does not need to connect to a local cache device by using a local gateway, and home gateway CPE may send only a service data request to the base station.

Figures 1, 2A:
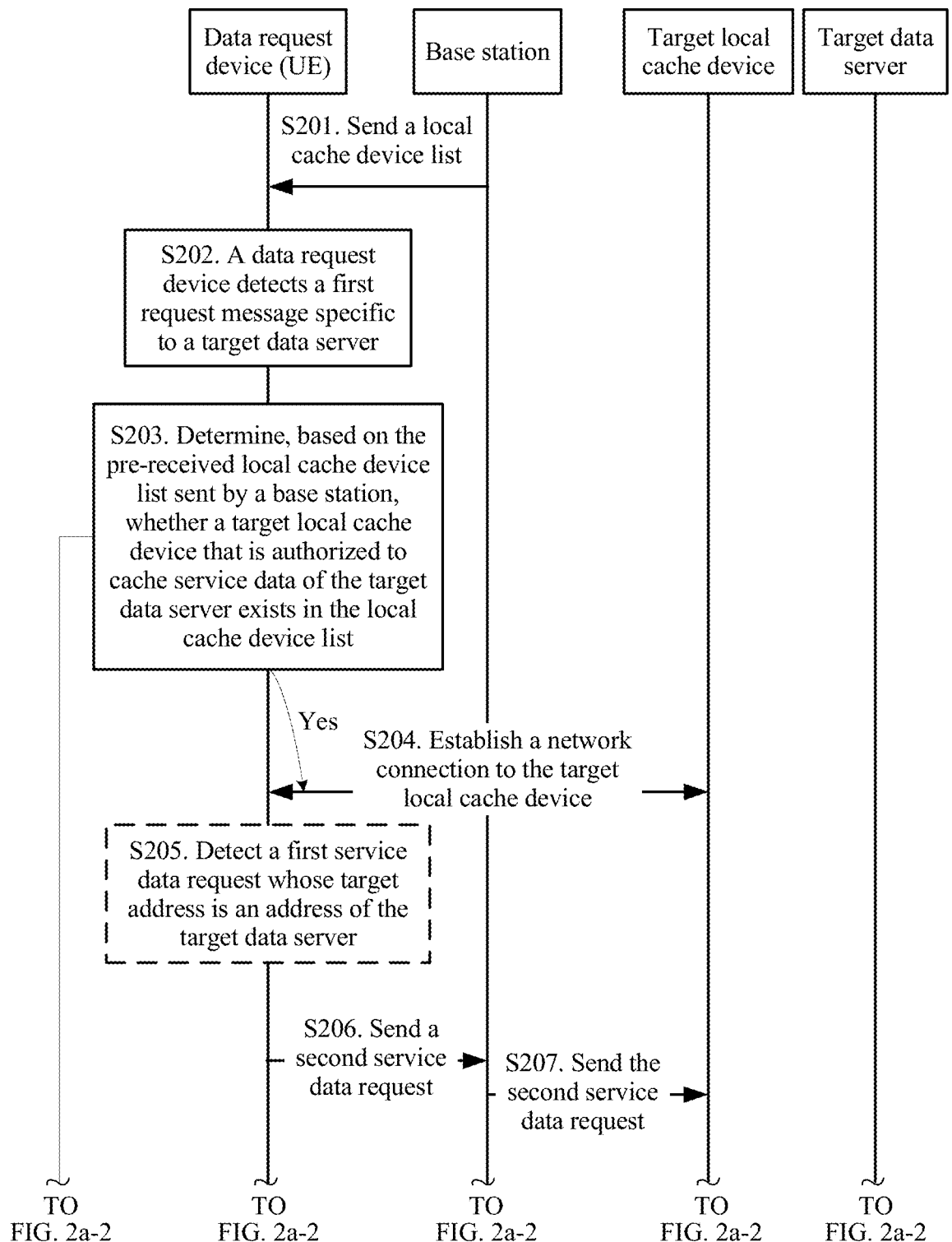
FIG. 2a-1 and FIG. 2a-2 are a schematic flowchart of a cache data request method according to an embodiment of the present disclosure.
Figures 2, 2A:
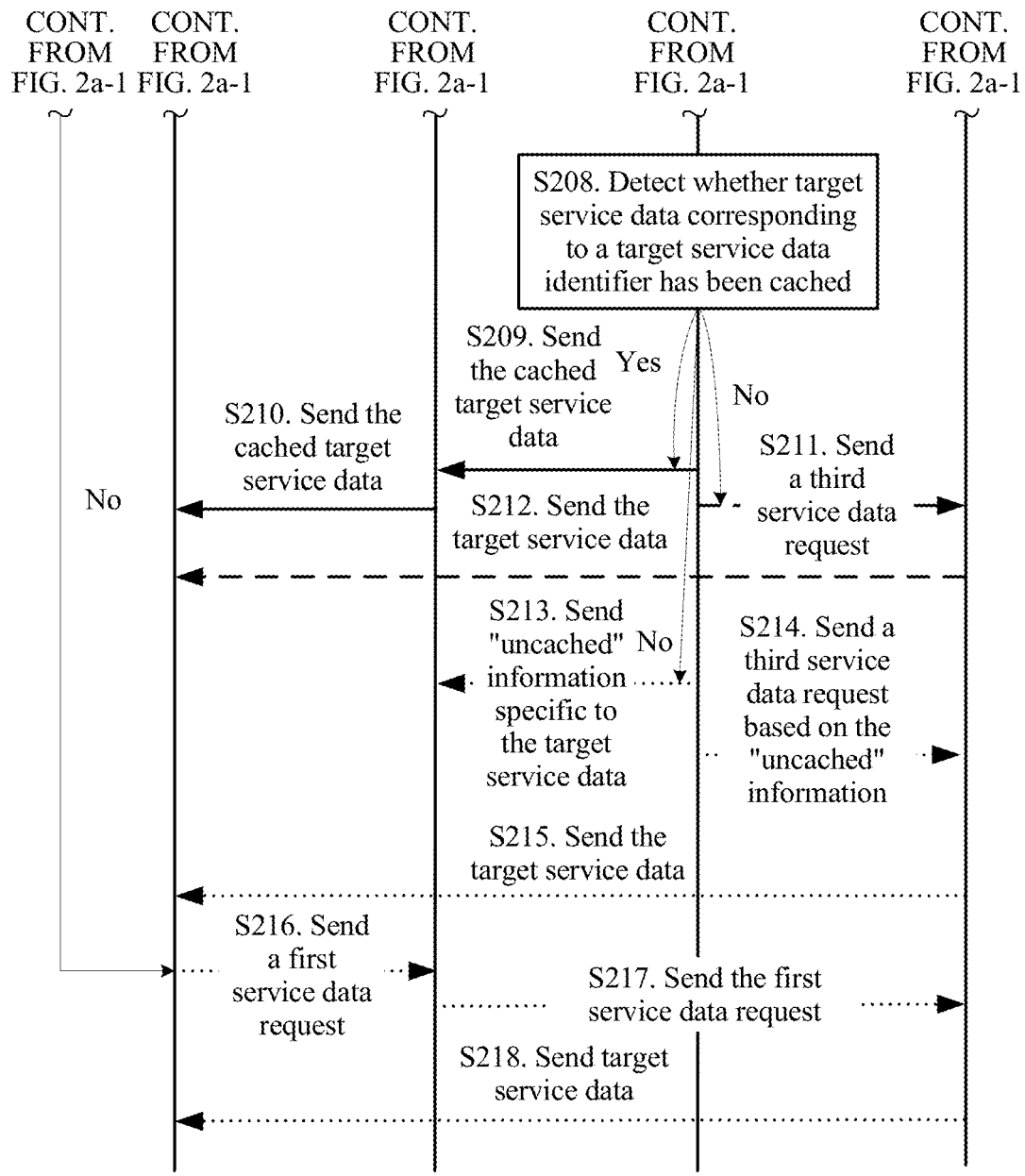
Figures 1, 2B:
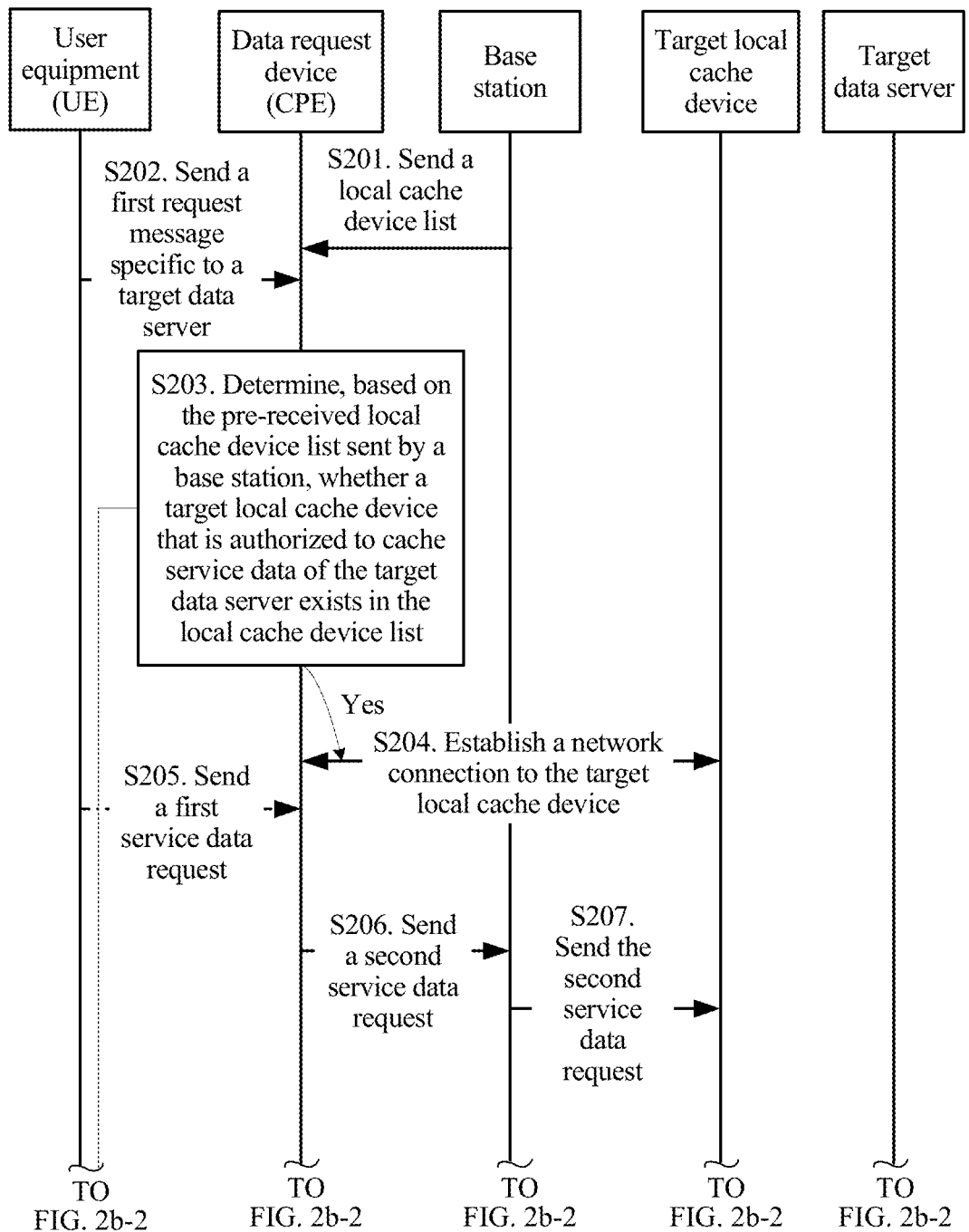
Figures 2, 2B:
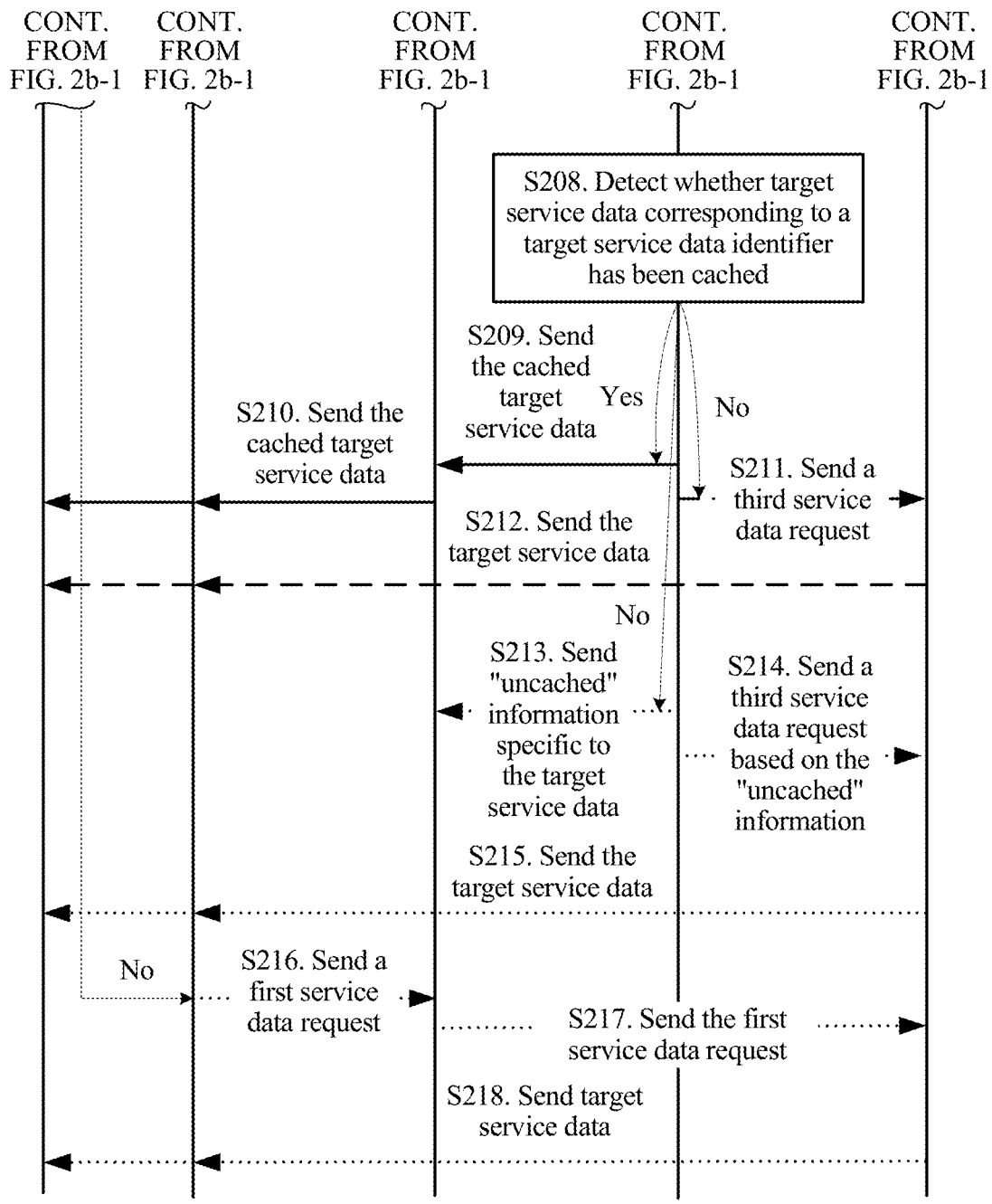

FIG. 2a-1 and FIG. 2a-2 are a schematic flowchart of a cache data request method according to an embodiment of the present disclosure. The method procedure is specific to an implementation scenario in which a data request device is user equipment UE. In this implementation scenario, for example, a target application program or a client that may trigger sending of a request to a target data server is installed in the user equipment, for example, a smartphone, and the user equipment or a modem module may perform cross-layer communication with the target application program or the client. FIG. 2b-1 and FIG. 2b-2 are a schematic flowchart of another cache data request method according to an embodiment of the present disclosure. The method procedure is specific to an implementation scenario in which a data request device is home gateway CPE. This embodiment of the present disclosure is specific to a scenario in which a base station does not serve as a local cache device, and is only connected to a plurality of independent local cache devices. In this embodiment of the present disclosure, scenarios shown in FIG. 2a-1 and FIG. 2a-2 and FIG. 2b-1 and FIG. 2b-2 are different only in operation S202 and operation S205, and therefore are jointly described in this embodiment.

The method includes the following operations.

Operation S201: A base station sends a local cache device list to a data request device managed by the base station.

The local cache device list includes an identifier of at least one local cache device. The local cache device may be an independent cache device connected to the base station, or may be a part of the base station. The identifier of the local cache device is an identifier that can uniquely identify the local cache device. For example, an IP (Internet Protocol) address, a port number, or the like of the local cache device may all be used as the identifier of the local cache device. Further, an index corresponding to the identifier may be carried, and the data request device may be user equipment, or may be home gateway CPE.

In a scenario, the base station is not connected to another independent local cache device, and only the base station serves as a local cache device. In this case, content in the local cache device list is an IP address and/or a port number of the base station. In another scenario, the base station does not serve as a local cache device, but is connected to a plurality of independent local cache devices. In this case, content of the local cache device list is an IP address and/or a port number of at least one local cache device that is connected to the base station. In still another scenario, the base station serves as a local cache device, and is also connected to at least one independent local cache device. In this case, content in the local cache device list is an IP address and/or a port number of the base station and an IP address and/or a port number of the at least one local cache device that is connected to the base station.

This embodiment of the present disclosure is specific to a scenario in which the base station does not serve as a local cache device, and is connected to a plurality of independent local cache devices. In other words, a target local cache device mentioned later in this embodiment of the present disclosure is a first cache device connected to the base station.

In this embodiment of the present disclosure, the base station may send the configured or saved local cache device list to the data request device in advance. The local cache device list may be sent to the data request device by using different message bearers. For example, the local cache device list may be carried by using radio resource control (RRC) dedicated signaling or a system message of the base station.

Before or after operation S201, a user uses an application program of the user equipment to trigger the application program to query an address of a target data server from a domain name system (DNS) server, and establish a transmission control protocol (TCP) connection to the target data server. In this case, the connection is a TCP connection between the application program and the target server. In a WTTx scenario, before or after the CPE receives the local cache device list sent by the base station, the user equipment establishes the TCP connection to the target data server by using the CPE. In the foregoing two implementation scenarios, messages sent in a TCP connection establishment process need to be transmitted by using a bearer between the data request device and the base station, and a bearer between the base station and a core network gateway. In the TCP connection establishment process, a procedure of establishing a related bearer may be triggered, and subsequent data to be transmitted between the data request device and the target data server may be transmitted by using a correspondingly established bearer.

Operation S202: The data request device detects a first request message specific to a target data server.

The first request message may be a connection establishment request that is sent when a connection to the target data server needs to be established in advance, or may be a service data request that is sent when some service data is requested from the target data server. The data request device may determine whether the first request message is specific to the target data server by detecting whether a target address of the first request message is an IP address and/or a port number of the target data server.

The target application program in the data request device herein may communicate with the data request device through cross-layer communication, so that the data request device detects the first request message specific to the target data server.

Further, when the data request device sends the first request message to the target data server, the TCP connection between the target application program and the target data server is triggered, and an serving gateway (SGW) that is connected to the target data server and that is corresponding to the base station to which the data request device belongs is triggered to establish an S1 connection, that is, a corresponding radio access bearer (RAB) is established between the base station and the SGW, and establishment of a radio bearer of an air interface between the base station and the data request device is triggered, and is used for data transmission between the data request device and the target data server.

In this case, when establishing the connection to the target data server, the target application program or the user equipment may receive the local cache device list sent in a related data packet by the base station; or receive the local cache device list that is sent by the data request device and that is received from the base station. The target application program or the user equipment determines, based on a comparison with a received cache content authorization list, whether to establish a connection to the target local cache device. An execution sequence of operation S201 and operation S202 is not specifically limited.

It should be noted that, as shown in FIG. 2a-1 and FIG. 2a-2, in an implementation scenario, the data request device is the user equipment, and when the target application program triggers the first request message, the data request device may directly detect the first request message.

Optionally, in the WTTx scenario, operation S202 can be:

the data request device receives a first request message that is sent by the user equipment and that is specific to the target data server.

As shown in FIG. 2b-1 and FIG. 2b-2, in another applicable WTTx implementation scenario, the data request device is home gateway CPE, the home gateway CPE is connected to the user equipment by using Wi-Fi, and after detecting the first request message, the user equipment sends the first request message to the data request device.

Operation S203: The data request device determines, based on the pre-received local cache device list sent by the base station, whether the target local cache device that is authorized to cache service data of the target data server exists in the local cache device list. If the target local cache device exists in the local cache device list, operations S204 and S215 are performed. If the target local cache device does not exist, operations S216 to S218 are performed.

The local cache device that is authorized to cache the service data of the target data server is a local cache device that has permission to cache the service data of the target data server. The data request device may pre-obtain a cache content authorization list, where the cache content authorization list may include identification information of a local cache device, that is, an identifier of at least one local cache device, and is used to indicate a local cache device that is available to the accessed target data server. Matching is performed between the identifier of the at least one local cache device in the local cache device list and an identifier of at least one local cache device in the identification information of the local cache device, and a local cache device corresponding to a matched identifier is the target local cache device. The identifier of the local cache device may be an IP address and/or a port number, and may be used to address a related local cache device.

Further, the cache content authorization list may include source user equipment identification information and/or uniform resource locator (Uniform Resource Locator, URL) information. The source user equipment identification information may be a device identifier of the user equipment, and is used to verify whether the user equipment is authorized to obtain a cache in the local cache device. The uniform resource locator URL information is used to indicate that service data corresponding to a URL in the target data server has been cached locally, and may be combined with the identification information of the local cache device to indicate a uniform resource locator (URL) corresponding to service data that is cached in a local cache device. The source user equipment identification information may be an IP address and/or a port number or a media access control (MAC) address of source user equipment or a terminal, and may be used to address the related source user equipment or the terminal.

In an implementation, the data request device may determine whether a first identifier consistent with the identifier of the local cache device in the local cache device list exists in the cache content authorization list, and if the first identifier exists in the cache content authorization list, determine that a local cache device corresponding to the first identifier is the target local cache device. If the first identifier does not exist in the cache content authorization list, it indicates that none of the at least one local cache device that is connected to the base station has permission to cache the service data of the target data server, that is, the target local cache device does not exist.

For example, it is assumed that Table 1 is the cache content authorization list, and Table 2 is the local cache device list. After comparing Table 1 with Table 2, it may be determined that the two tables both have an IP address 112.111.154.224. Therefore, a local cache device whose IP address is 112.111.154.224 is the target local cache device.

TABLE 1

Cache content authorization list (example)
IP address of the local cache device that is authorized
by the target data server to perform caching 183.16.118.124
150.214.137.160
112.111.154.224
177.08.187.80
224.43.201.59
165.89.17.197

TABLE 1-continued

Cache content authorization list (example)
IP address of the local cache device that is authorized
by the target data server to perform caching

TABLE 2

Local cache device list (example)
IP address of the local cache device connected to the base station 207.211.135.210
112.111.154.224

When the cache content authorization list includes uniform resource locator URL information, the cache content authorization list may not only indicate the at least one local cache device that is authorized to cache the service data of the target data server, but also precisely indicate a local cache device that is authorized to cache service data that is corresponding to all URLs cached by a local cache device and that is in the target data server. In some implementation scenarios, the first request message carries a target service data identifier. The target service data identifier herein may be a URL. In this case, the data request device may obtain, by using the cache content authorization list, an identifier of at least one local cache device that is authorized to cache the URL, and perform matching between the obtained identifier of the at least one local cache device and the identifier of the at least one local cache device in the local cache device list, to determine the target local cache device.

For example, it is assumed that Table 3 is the cache content authorization list, Table 2 is the local cache device list, and a target service data identifier of a first service data request is a URL 3. It may be determined that two local cache devices whose IP addresses are 148.16.12.12 and 207.211.135.210 are both authorized to cache target service data corresponding to the URL 3, and it may be further determined whether an IP address consistent with an IP address of a local cache device that is authorized to cache the URL 3 in Table 3 exists in the IP addresses in Table 2. It may be seen that a local cache device whose IP address is 207.211.135.210 is the target local cache device.

TABLE 3

Cache content authorization list (example)

| IP address of the local cache device that is authorized by the target data server to perform caching | Identifier of the service data that the local cache device is authorized to cache (for example, a URL) |
|---|---|
| 148.16.12.12 | URL1 URL2 URL3 URL4 URL5 URL6 URL7 |
| 122.115.153.173 | URL2 URL5 URL6 URL8 URL10 |
| 207.211.135.210 | URL3 URL6 URL7 URL11 URL12 URL13 |
| . . . | . . . |

It should be noted that, the cache content authorization list may be sent by the target data server to the target application program or the user equipment when the target application program or the user equipment establishes the TCP connection to the target data server. The cache content authorization list may be obtained across layers between the data request device and the target application program, or may be obtained by the data request device by parsing a data packet sent to the target application program or the user equipment, or may be sent by a public land mobile network (PLMN) to the data request device based on a registration status of the data request device when the data request device performs network registration, or may be user registration information transmitted across layers from the target application program. This is not specifically limited herein.

Further, when the data request device determines that there are a plurality of target local cache devices, one may be selected based on a preconfigured priority, or one may be selected according to a specific operation rule.

Operation S204: The data request device establishes a network connection to the target local cache device, where the network connection is used to send a service data request specific to the target data server to the target local cache device and further transmit data.

After determining that the target local cache device exists on a base station side to which the data request device belongs, the data request device may establish a TCP connection to the target local cache device, that is, establish a data transmission channel between the target local cache device and the data request device, so that the data request device can directly initiate the service data request to the target local cache device when receiving the service data request specific to the target data server. Further, the target local cache device may also send the requested service data to the data request device.

In a connection establishment process, the data request device sends a second request message to the base station to which the data request device belongs, where the second request message may be a request used for establishing the connection to the target local cache device. The second request message carries routing information, and the routing information is used to indicate the target local cache device, so that the base station establishes the connection between the data request device and the target local cache device. The routing information may include an identifier of the target local cache device or an index (index) of the target local cache device.

In an implementation, a cache transmission resource bearer may be established for a local gateway (LGW) that is connected to the target local cache device, that is, an S1 connection, and the connection may be established by using an initial UE message or another S1 message. In this case, the LGW has an mobility management entity (MME) function, and may establish a control plane connection and establish and allocate a user plane bearer. In another implementation, the base station may still establish a control plane connection to the MME. However, an indication indicating that a user plane bearer is established with the LGW is added to a corresponding message, and the MME assigns a radio access bearer (RAB), and establishes a user plane transmission channel between the base station and the LGW, where the user plane transmission channel is used to carry a data request sent by the data request device to the target local cache device.

In a process of establishing a related bearer, the second request message may be included in an radio resource control (RRC) message, where the RRC message carries indication information that instructs the base station to send a user plane connection request to the target local cache device, to trigger the base station to establish a related bearer with the target local cache device; or after the base station determines that a target terminal of the request is the target local cache device by using a target address of the second request message, the base station is triggered to establish an S1 connection to the target local cache device. Herein, establishing an S1 connection includes triggering establishment of a RAB between the target local cache device and the base station, to set up a channel for sending service data. In addition, establishing an S1 connection further includes establishment of an air interface (between the base station and the data request device) bearer. Alternatively, an air interface bearer established during previous establishment of the connection to the target data server may be used to transmit data destined for the target local cache device. It should be noted that, for an air interface bearer, that is, an radio bearer (RB), different RBs are corresponding to different TCP connections, and data of different TCP connections may be distinguished by using a logical channel ID (LCH ID) or a Packet Data Convergence Protocol identifier (PDCP ID) or a radio bearer identifier (RB ID) or a flow identifier.

Further, it has been noted in operation S202 that the target application program or the user equipment has previously established the TCP connection to the corresponding target data server, that is, the base station has previously established an S1 connection and/or a bearer to the SGW. In this case, the base station establishes an S1 connection and/or a bearer to each of the LGW and the SGW, to carry a data request between the data request device and the target local cache device and a data request between the data request device and the target data server. In an implementation scenario, after establishing the connection to the LGW, the base station may remove the bearer between the base station and the SGW, and only maintain the bearer between the base station and the LGW. In another implementation scenario, after establishing the bearer to the LGW, the base station may simultaneously maintain the bearer between the base station and the SGW and the bearer between the base station and the LGW.

In some implementation scenarios, when the base station is equipped with a deep packet inspection (DPI) technology, the target application program installed in the data request device or the user equipment in the WTTx scenario may directly establish the TCP connection to the target local cache device. In other words, the TCP connection may exist between the target application program installed in the data request device or the user equipment and the target local cache device. In this implementation scenario, air interface (between the base station and the data request device) bearer establishment is not triggered because the data request device does not perceive the TCP connection establishment process. That is, an original air interface is used between the data request device and the base station to bear transmission. However, an S1 connection and/or a bearer exist/exists between the base station and each of the LGW and the SGW.

Operation S205: The data request device detects a first service data request whose target address is an address of the target data server.

The first service data request may be triggered and generated after the user performs some operations on an application program in the data request device, or may be triggered and generated when some application programs in the data request device detect that data needs to be updated or the like. The first service data request carries a target service data identifier, and is used to indicate target service data requested by the data request device. For example, the target service data identifier may be a uniform resource locator of the target service data.

It should be noted that, as shown in FIG. 2a-1 and FIG. 2a-2, in an implementation scenario, the data request device is the user equipment, and when an application program triggers the first service data request, the data request device may directly detect the first service data request. For example, when the user taps a video B in an application program A, the data request device may detect the first service data request, where a target address of the first service data request is an address of a data server corresponding to the application program A, and carries a URL corresponding to the video B.

Optionally, in the WTTx scenario, operation S205 can be:
the data request device receives a first service data request that is sent by the user equipment and whose target address is an address of the target data server.

As shown in FIG. 2b-1 and FIG. 2b-2, in another applicable WTTx implementation scenario, the data request device is home gateway CPE, the home gateway CPE is connected to the user equipment by using Wi-Fi, and after detecting the first service data request, the user equipment sends the first service data request to the CPE.

Optionally, when the first request message sent by the data request device is the first service data request that includes the target service data identifier, the data request device directly performs operation S206 after operation S204.

Operation S206: The data request device sends a second service data request to the base station.

The data request device modifies the target address in the first service data request to an address of the target local cache device, to generate the second service data request, where the second service data request still carries the target service data identifier, and indicates that the requested data is the target service data.

In an implementation scenario, after determining that the target local cache device exists and receiving the first service data request specific to the target data server, in a manner of radio bearer channel designation, the data request device may use the radio bearer channel that is pre-established in operation S204 between the data request device and the target local cache device to directly transmit the second service data request generated from the first service data request. In this case, the base station does not need to further view routing information of the second service data request, and may directly forward the second service data request to a specified radio bearer established with the target local cache device.

In another implementation scenario, the data request device may add an indication to the second service data request to be sent to the base station, to indicate that the second service data request is to be routed to the target local cache device, where the indication may be an IP address, an index, or the like of the target local cache device. The base station may determine, by obtaining the indication or by parsing a target address of the second service data request, that the second service data request is destined for the target local cache device, to send the second service data request to the target local cache device by using a radio bearer pre-established with the target local cache device.

It should be noted that, in a general case, the base station is not equipped with the deep packet inspection technology. Therefore, when the data request device is user equipment, application layer data needs to be transmitted to the modem module after cross-layer communication with the target application program, and then the data request device transmits the second service data request specific to the modem module to the base station. In another case, if the base station is equipped with the deep packet detection technology, the target application program in the data request device may directly transmit a second service data request generated at an application layer to the base station.

Operation S207: The base station sends the second service data request to the target local cache device.

Operation S208: The target local cache device detects whether target service data corresponding to the target service data identifier has been cached. If it is detected that the target service data has been cached, operations S209 and S210 are performed; if it is detected that the target service data has not been cached, operations S211 and S212 or operations S213 to S215 are performed.

After receiving the second service data request, the target local cache device may detect, based on the target service data identifier carried in the second service data request, whether the target local cache device has cached the target service data corresponding to the target service data identifier. It may be understood that, in operation S203, it is determined that the target local cache device is a local cache device that is authorized to cache the service data of the target data server. However, the target local cache device may have cached only some service data of the target data server, or may not cache any service data of the target data server at all. Therefore, in this operation, the target local cache device needs to further detect whether the target service data has been cached.

Operation S209: The target local cache device sends the cached target service data to the base station.

After determining that the target service data has been cached, the target local cache device may send a response message (i.e., HTTP Response) to the base station, where a source IP address may be filled in as the address of the target data server (or after receiving a data packet that includes the IP address of the target local cache device, the data request device needs to modify a source IP address to the address of the target data server); and then send the target service data to the data request device by using the established bearer.

Operation S210: The base station sends the cached target service data to the data request device.

After receiving the response message and/or the target service data that are/is sent by the target local cache device, the base station may send related data to the data request device. For example, if the data request device requests data of the video B, the data of the video B sent by the base station may now be received.

Operation S211: The target local cache device sends a third service data request to the target data server.

After determining that the target service data has not been cached, the target local cache device may establish the TCP connection to the target data server, and then send the third service data request to the target data server, where the third service data request carries the target service data identifier. It should be noted that a source address of the third service data request herein may be the address of the target local cache device or the data request device. This is not specifically limited herein.

Optionally, the target local cache device may send a message to the data request device, to request removal of the TCP connection between the data request device and the target local cache device.

Operation S212: The target data server sends the target service data to the data request device.

After receiving the third service data request, the target data server sends a response message to the target local cache server, and then obtains the target service data and transmits the target service data to the data request device.

Optionally, operations S211 and S212 may be further operations S213 to S215.

Operation S213: The target local cache device sends information indicating non-cached specific to the target service data to the base station.

After determining that the target service data has not been cached, the target local cache device may send the information indicating non-cached specific to the target service data to the base station. The information indicating non-cached may be carried by using communications signaling, and is used to indicate to the base station that the target local cache device has not cached the target service data.

Operation S214: The base station sends a third service data request to the target data server based on the information indicating non-cached.

After receiving the information indicating non-cached specific to the target service data, the base station may send the third service data request to the target data server, where the third service data request carries the target service data identifier.

Operation S215: The target data server sends the target service data to the data request device.

After receiving the third service data request, the target data server sends a response message to the base station, and then obtains the target service data and transmits the target service data to the data request device.

Operation S216: The data request device sends a first service data request to the base station.

The data request device sends the first service data request to the base station after determining that the target local cache device that is authorized to cache the service data of the target data server does not exist.

Operation S217: The base station sends the first service data request to the target data server.

The base station can determine, based on a target address of the first service data request, to send the first service data request to the target data server.

Operation S218: The target data server sends target service data to the data request device.

After receiving the first service data request, the target data server obtains the target service data and transmits the target service data to the data request device.

It should be noted that, in the WTTx scenario shown in FIG. 2b-1 and FIG. 2b-2, after receiving the target service data from the base station, the target local cache device, or the target data server, the data request device in the foregoing embodiment further needs to send the target service data to the user equipment.

In the embodiments shown in FIG. 2a-1 and FIG. 2a-2 and FIG. 2b-1 and FIG. 2b-2, after detecting the first request message specific to the target data server, the data request device determines, based on the pre-received local cache device list sent by the base station, the target local cache device that is authorized to cache the service data of the target data server, and establishes the network connection to the target local cache device, so that the data request device can directly request the target service data from a local cache device in proximity. This avoids a waste of transmission overheads and a relatively large transmission delay that are caused by requesting data from the target data server, and therefore, a response speed of the data request device after the data request is increased, and user experience is improved.

Figures 1, 3A:
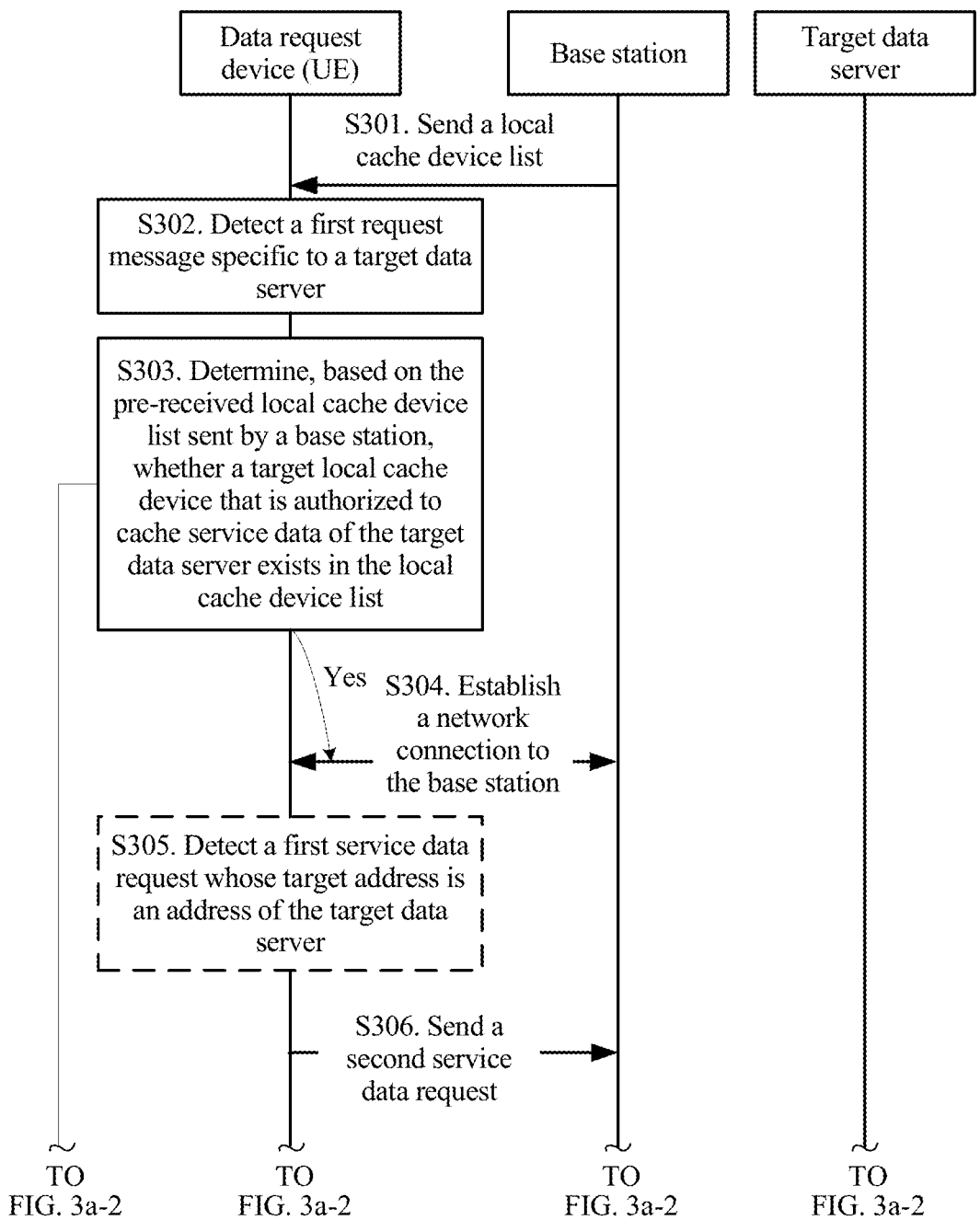
Figures 2, 3A:
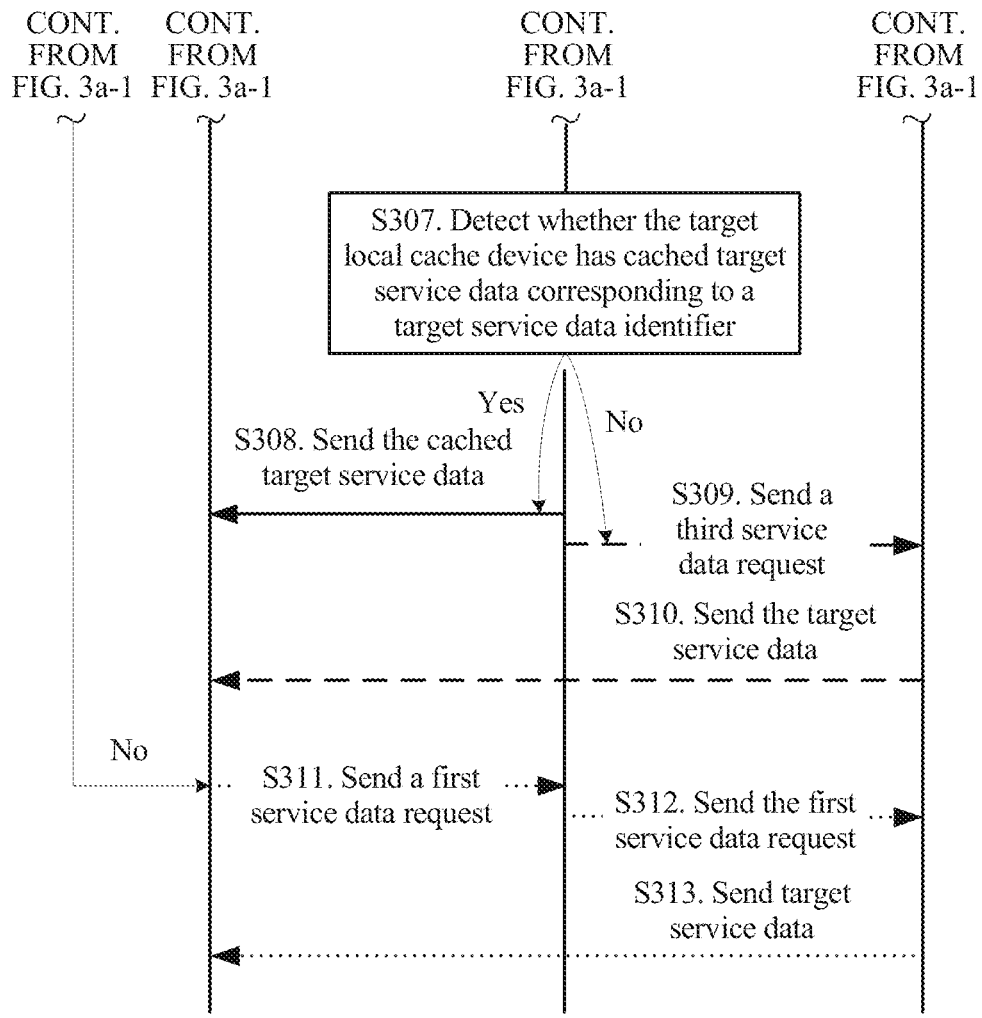
Figures 1, 3B:
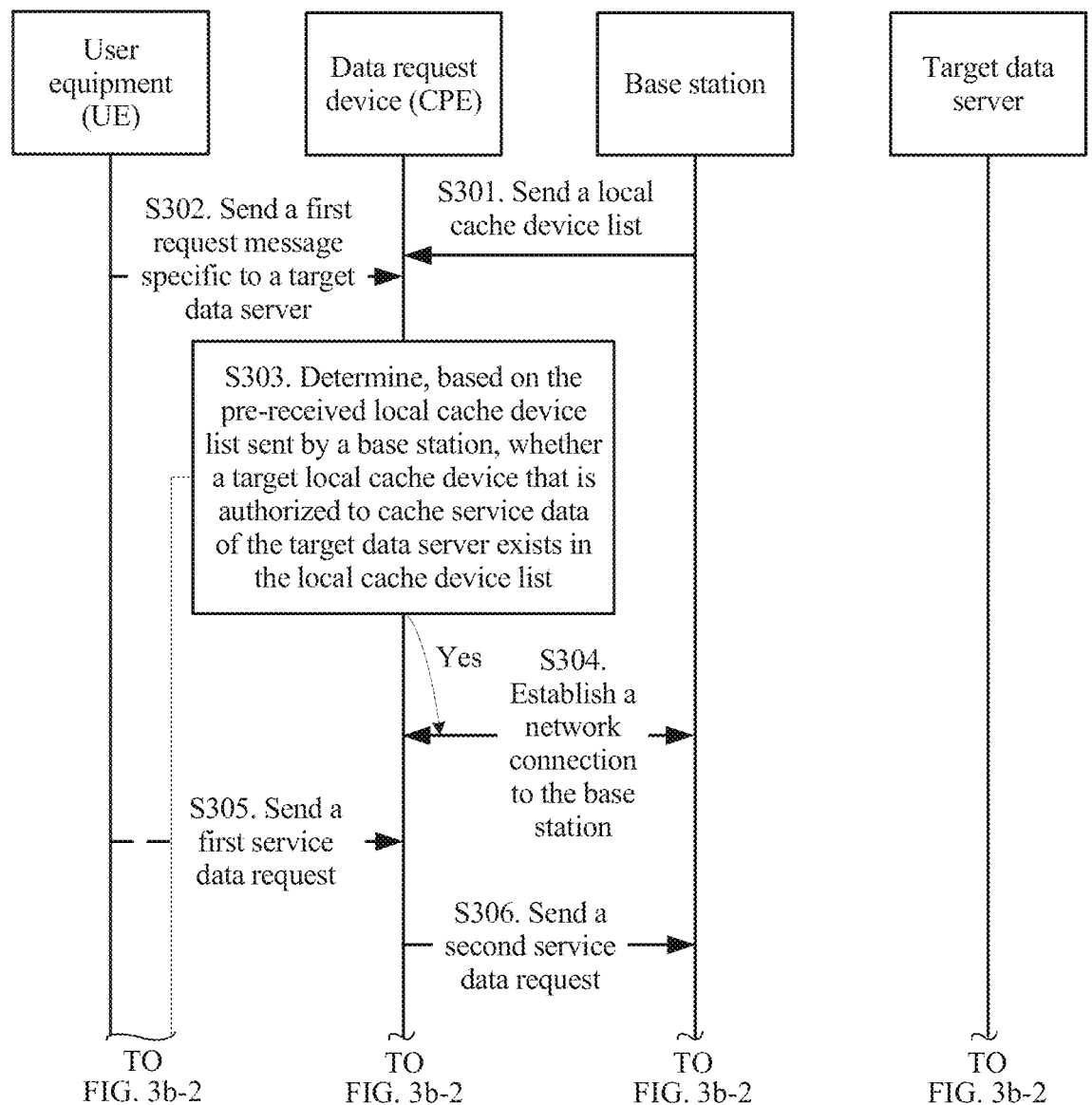
Figures 2, 3B:
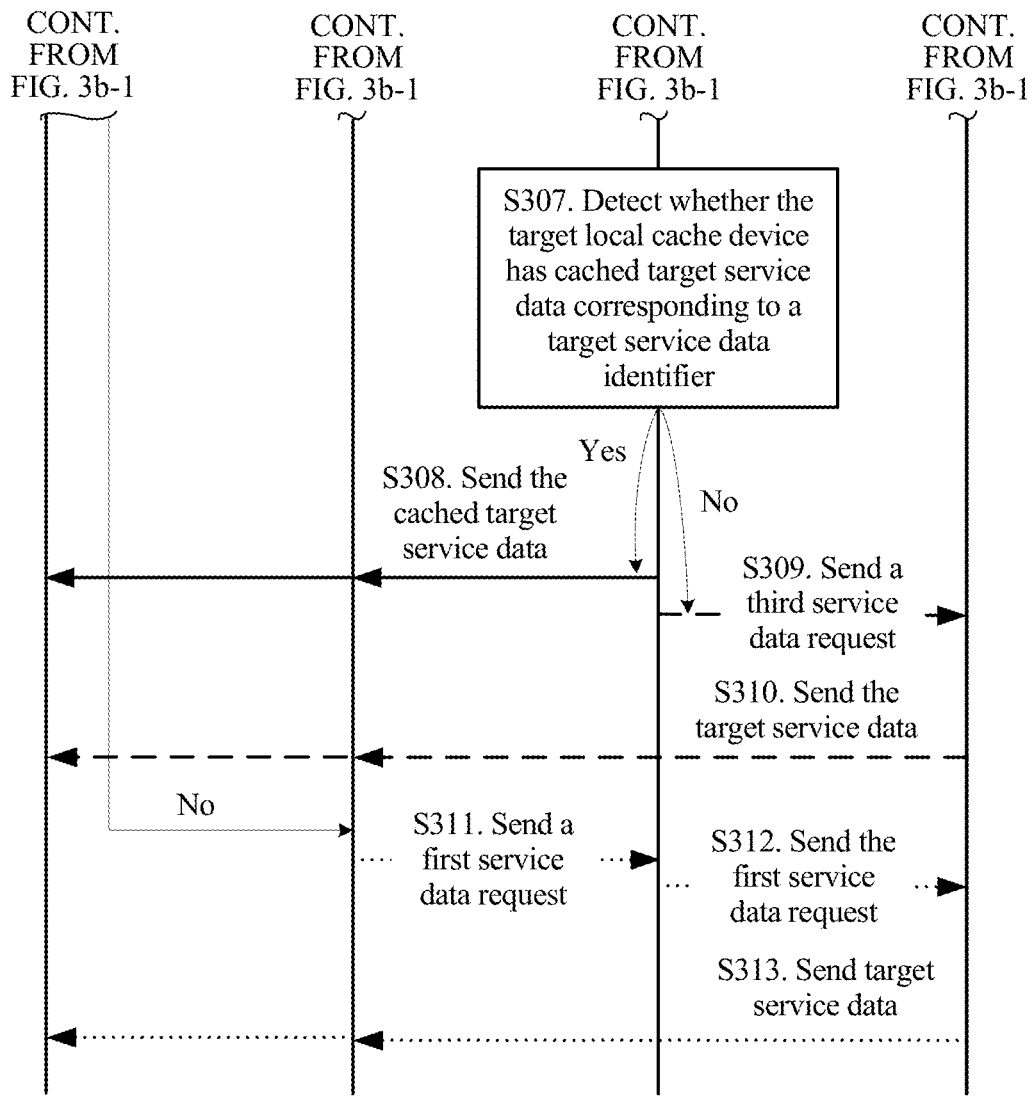

FIG. 3a-1 and FIG. 3a-2 are a schematic flowchart of still another cache data request method according to an embodiment of the present disclosure. The method procedure is specific to an implementation scenario in which a data request device is user equipment UE. FIG. 3b-1 and FIG. 3b-2 are a schematic flowchart of yet another cache data request method according to an embodiment of the present disclosure. The method procedure is specific to an implementation scenario in which a data request device is home gateway CPE. This embodiment of the present disclosure is specific to a scenario in which a base station serves as a local cache device. In this embodiment of the present disclosure, scenarios shown in FIG. 3a-1 and FIG. 3a-2 and FIG. 3b-1 and FIG. 3b-2 are different only in operation S302 and operation S305, and therefore are jointly described in this embodiment.

Operation S301: A base station sends a local cache device list to a data request device managed by the base station.

In this embodiment of the present disclosure, the base station is not connected to another independent local cache device, and only the base station serves as a local cache device. In this case, content in the local cache device list is an IP address and/or a port number of the base station.

Operation S302: The data request device detects a first request message specific to a target data server.

It should be noted that an execution sequence of operation S301 and operation S302 is not limited.

Operation S303: The data request device determines, based on the pre-received local cache device list sent by the base station, whether a target local cache device that is authorized to cache service data of the target data server exists in the local cache device list. If the target local cache device exists in the local cache device list, operations S304 to S310 are performed. If the target local cache device does not exist, operations S311 to S313 are performed.

In this embodiment of the present disclosure, the content in the local cache device list is the IP address and/or the port number of the base station, and the data request device only needs to determine whether the base station is the target local cache device that is authorized to cache the service data of the target data server. For a specific implementation method, further refer to operation S203.

Operation S304: The data request device establishes a network connection to the base station, where the network connection is used to send a service data request specific to the target data server to the target local cache device and further transmit data.

After determining that the base station to which the data request device belongs is the target local cache device, the data request device may establish a TCP connection to the base station, that is, establish a data transmission channel between the base station and the data request device, so that the data request device can directly initiate the service data request to the base station when receiving the service data request specific to the target data server. Further, the base station may also send the requested service data to the data request device.

In a connection establishment process, the data request device sends a second request message to the base station to which the data request device belongs, where the second request message may be a request used for establishing a connection to the target local cache device. The second request message carries routing information, and the routing information is used to indicate the target local cache device, so that the base station establishes the connection between the data request device and the base station, and further triggers establishment of an air interface (between the base station and the data request device) bearer. Alternatively, an air interface bearer established during previous establishment of a connection to the target data server to transmit the data destined for the base station. It should be noted that, for an air interface bearer, that is, a radio bearer (RB), different RBs are corresponding to different TCP connections, and data of different TCP connections may be distinguished by using a logical channel ID (ILCH ID) or a Packet Data Convergence Protocol identifier (PDCP ID) or a radio bearer identifier (RB ID) or a flow identifier.

Operation S305: The data request device detects a first service data request whose target address is an address of the target data server.

Optionally, in a WTTx scenario, operation S305 can be: the data request device receives a first service data request that is sent by the user equipment and whose target address is an address of the target data server, as shown in FIG. 3b-1 and FIG. 3b-2.

Operation S306: The data request device sends a second service data request to the base station.

After determining that the base station is the target local cache device that is authorized to cache the service data of the target data server, the data request device may modify the target address in the first service data to an address of the base station, to generate the second service data request, where the second service data request still carries a target service data identifier, to indicate that requested data is target service data.

The second service data request includes routing information, and the base station may determine, based on the routing information of the second service data request, that a target terminal of the second service data request is the base station.

In an implementation scenario, after determining that the target local cache device exists and receiving the first service data request specific to the target data server, in a manner of radio bearer channel designation, the data request device may use the radio bearer channel that is pre-established in operation S304 between the data request device and the base station to directly transmit the second service data request generated from the first service data request. In this case, the base station does not need to further view the routing information of the second service data request.

In another implementation scenario, the data request device may add an indication to the second service data request to be sent to the base station, to indicate that the second service data request is to be routed to the target local cache device, where the indication may be an IP address, an index, or the like of the target local cache device. The base station may determine, by obtaining the indication or by parsing a target address of the second service data request, that the second service data request is destined for a target local cache device of the base station.

Operation S307: The base station detects whether the target local cache device has cached target service data corresponding to the target service data identifier. If it is detected that the target service data has been cached, operation S308 is performed; if it is detected that the target service data has not been cached, operations S309 and S310 are performed.

After determining that the base station is the target local cache device, the base station may detect, based on the target service data identifier carried in the second service data request, whether the target service data corresponding to the target service data identifier has been cached in the target local cache device of the base station.

Operation S308: The base station sends the cached target service data to the data request device.

Operation S309: The base station sends a third service data request to the target data server.

After determining that the target local cache device of the base station has not cached the target service data, the base station may send the third service data request to the target data server, where the third service data request carries the target service data identifier. It should be noted that a source address of the third service data request herein may be the address of the base station or may be the data request device. This is not specifically limited herein.

Operation S310: The target data server sends the target service data to the data request device.

Operation S311: The data request device sends a first service data request to the base station.

Operation S312: The base station sends the first service data request to the target data server.

Operation S313: The target data server sends target service data to the data request device.

It should be noted that, in the WTTx scenario shown in FIG. 3b-1 and FIG. 3b-2, after receiving the target service data from the base station or the target data server, the data request device in the foregoing embodiment further needs to send the target service data to the user equipment.

In the embodiments shown in FIG. 3a-1 and FIG. 3a-2 and FIG. 3b-1 and FIG. 3b-2, after detecting the first request message specific to the target data server, the data request device determines, based on the pre-received local cache device list sent by the base station, the target local cache device that is authorized to cache the service data of the target data server, and establishes the network connection to the base station, so that the data request device can directly request the target service data from the base station. This avoids a waste of transmission overheads and a relatively large transmission delay that are caused by requesting data from the target data server, and therefore, a response speed of the data request device after the data request is increased, and user experience is improved.

In a scenario in which the base station serves as a local cache device and is also connected to at least one independent local cache device, a method for obtaining cache data may be implemented by combining the method procedures in the foregoing two embodiments.

Figure 4:
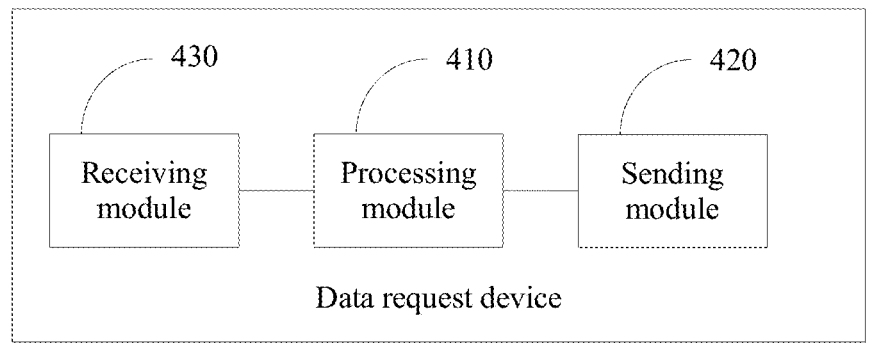
FIG. 4 is a schematic structural diagram of a data request device according to an embodiment of the present disclosure.

FIG. 4 is a schematic structural diagram of a data request device according to an embodiment of the present disclosure. As shown in FIG. 4, the device includes:

a processing module 410, configured to: detect a first request message specific to a target data server; determine, based on a pre-received local cache device list sent by a base station, a target local cache device used to cache service data of the target data server; and establish a network connection to the target local cache device; and a sending module 420, configured to send a service data request specific to the target data server to the target local cache device by using the network connection.

Optionally, the processing module 410 is further configured to detect a first service data request whose target address is an address of the target data server, where the first service data request carries a target service data identifier; and the sending module 420 is further configured to send a second service data request to the target local cache device, where the second service data request carries the target service data identifier, and the second service data request is used to instruct the target local cache device to send, when detecting that target service data corresponding to the target service data identifier has been cached, the cached target service data to the data request device; and the device further includes:

a receiving module 430, configured to receive the target service data sent by the target local cache device.

Optionally, the first request message includes a target service data identifier, and is used to request target service data corresponding to the target service data identifier;

the sending module 420 is further configured to send a second service data request to the target local cache device, where the second service data request carries the target service data identifier, and the second service data request is used to instruct the target local cache device to send, when detecting that the target service data corresponding to the target service data identifier has been cached, the cached target service data to the data request device; and the device further includes:

a receiving module 430, configured to receive the target service data sent by the target local cache device.

Optionally, the local cache device list includes an identifier of at least one local cache device; and the processing module 410 is configured to:

determine whether a first identifier consistent with an identifier of a local cache device in the local cache device list exists in a pre-obtained cache content authorization list, where the cache content authorization list includes an identifier of at least one local cache device that is authorized by the target data server to perform caching; and if the first identifier exists in the cache content authorization list, determine that a local cache device corresponding to the first identifier is the target local cache device.

Optionally, the receiving module 430 is further configured to:

receive the cache content authorization list sent by the target data server.

Optionally, the local cache device includes a base station to which the data request device belongs and/or at least one first cache device connected to the base station.

Optionally, the processing module 410 can be configured to:

send a second request message to a base station to which the data request device belongs, where the second request message carries routing information, the routing information is used to indicate the target local cache device, and the second request message is used to instruct the base station to establish the connection between the data request device and the target local cache device.

Optionally, the routing information can include an identifier of the target local cache device or an index of the target local cache device.

Optionally, the processing module 410 can be configured to:

receive a first service data request that is sent by user equipment and whose target address is the address of the target data server.

In the embodiment shown in FIG. 4, after detecting the first request message specific to the target data server, the data request device determines, based on the pre-received local cache device list sent by the base station, the target local cache device that is authorized to cache the service data of the target data server, and establishes the network connection to the target local cache device, so that the data request device can directly request the target service data from a local cache device in proximity. This avoids a waste of transmission overheads and a relatively large transmission delay that are caused by requesting data from the target data server, and therefore, a response speed of the data request device after the data request is increased, and user experience is improved.

Figure 5:
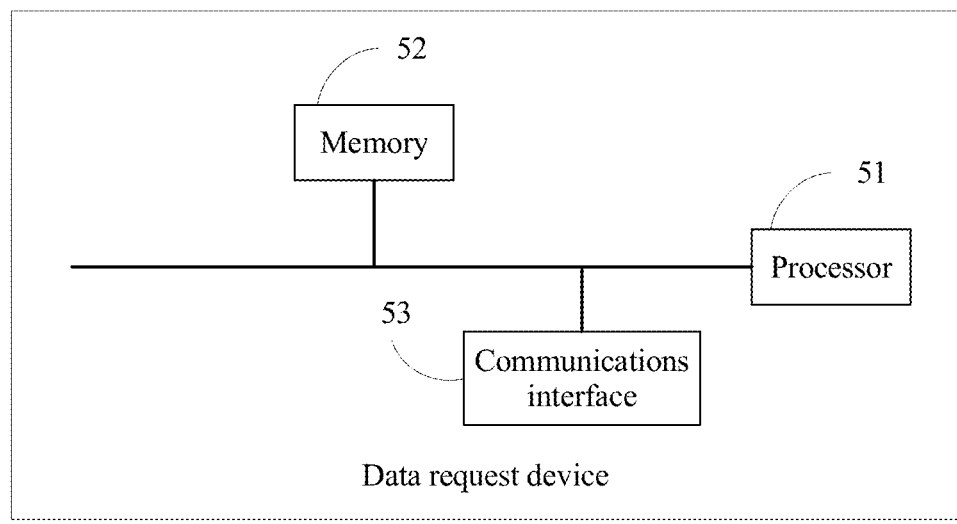
FIG. 5 is a schematic structural diagram of another data request device according to an embodiment of the present disclosure.

FIG. 5 is a schematic structural diagram of another data request device according to an embodiment of the present disclosure. As shown in FIG. 5, the device includes a processor 51, a memory 52, and a communications interface 53. The processor 51 is connected to the memory 52 and the communications interface 53. For example, the processor 51 may be connected to the memory 52 and the communications interface 53 by using a bus.

The processor 51 is configured to support the data request device in performing a corresponding function in the foregoing methods. The processor 51 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

The memory 52 is configured to store a local cache device list, program code, and the like. The memory 52 may include a volatile memory, for example, a random access memory RAM); the memory 52 may also include a nonvolatile memory, for example, a read-only memory (ROM), a flash memory, a hard disk drive (HDD), or a solid-state drive (SSD); the memory 52 may further include a combination of memories of the foregoing types.

The communications interface 53 is configured to communicate with a base station to receive and send messages used in the foregoing method.

The processor 51 may invoke the program code to perform the following operations:

detecting a first request message specific to a target data server; determining, based on a pre-received local cache device list sent by a base station, a target local cache device used to cache service data of the target data server; and establishing a network connection to the target local cache device, and sending a service data request specific to the target data server to the target local cache device by using the network connection.

Optionally, after establishing the network connection to the target local cache device, the processor 51 can be further configured to:

detect a first service data request whose target address is an address of the target data server, where the first service data request carries a target service data identifier; send a second service data request to the target local cache device by using the communications interface 53, where the second service data request carries the target service data identifier, and the second service data request is used to instruct the target local cache device to send, when detecting that target service data corresponding to the target service data identifier has been cached, the cached target service data to the data request device; and receive, by using the communications interface 53, the target service data sent by the target local cache device.

Optionally, the first request message can include a target service data identifier, and is used to request target service data corresponding to the target service data identifier; and after establishing the network connection to the target local cache device, the processor 51 is further configured to:

send a second service data request to the target local cache device by using the communications interface 53, where the second service data request carries the target service data identifier, and the second service data request is used to instruct the target local cache device to send, when detecting that the target service data corresponding to the target service data identifier has been cached, the cached target service data to the data request device; and receive, by using the communications interface 53, the target service data sent by the target local cache device.

Optionally, the local cache device list can include an identifier of at least one local cache device; and when determining, based on the pre-obtained local cache device list, the target local cache device that is authorized to cache the service data of the target data server, the processor 51 is configured to:

determine whether a first identifier consistent with an identifier of a local cache device in the local cache device list exists in a pre-obtained cache content authorization list, where the cache content authorization list includes an identifier of at least one local cache device that is authorized by the target data server to perform caching; and if the first identifier exists in the cache content authorization list, determine that a local cache device corresponding to the first identifier is the target local cache device.

Optionally, before determining whether the first identifier consistent with the identifier of the at least one local cache device in the local cache device list exists in the pre-obtained cache content authorization list, the processor 51 can be further configured to:

receive, by using the communications interface 53, the cache content authorization list sent by the target data server.

Optionally, the local cache device can include a base station to which the data request device belongs and/or at least one first cache device connected to the base station.

Optionally, when establishing the network connection to the target local cache device, the processor 51 can be configured to:

send, by using the communications interface 53, a second request message to a base station to which the data request device belongs, where the second request message carries routing information, the routing information is used to indicate the target local cache device, and the second request message is used to instruct the base station to establish the connection between the data request device and the target local cache device.

Optionally, the routing information can include an identifier of the target local cache device or an index of the target local cache device.

Optionally, when detecting the first service data request whose target address is the address of the target data server, the processor 51 can be configured to:

receive, by using the communications interface 53, a first service data request that is sent by user equipment and whose target address is the address of the target data server.

Figure 6:
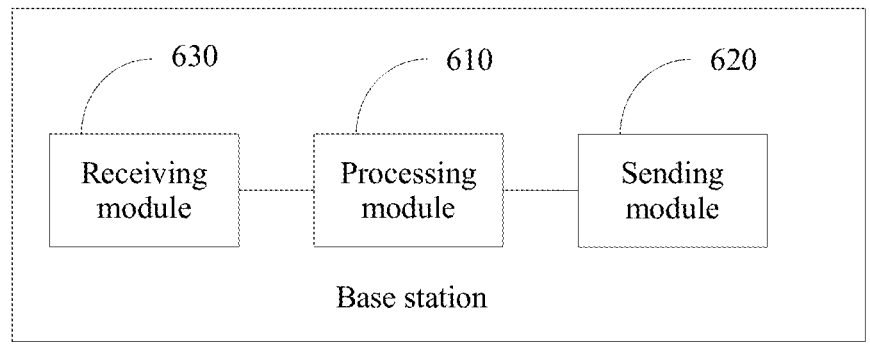
FIG. 6 is a schematic structural diagram of a base station according to an embodiment of the present disclosure.

FIG. 6 is a schematic structural diagram of a base station according to an embodiment of the present disclosure. As shown in FIG. 6, the base station includes:

a processing module 610, configured to obtain a local cache device list, where the local cache device list includes an identifier of at least one local cache device; and a sending module 620, configured to send the local cache device list to a data request device managed by the base station, where the local cache device list is used by the data request device to determine a target local cache device used to cache service data of the target data server.

Optionally, the base station further includes:

a receiving module 630, configured to receive a second request message sent by the data request device, where the second request message carries routing information, and the routing information is used to indicate the target local cache device; and the processing module 610 is further configured to establish a connection between the data request device and the target local cache device based on the second request message.

Optionally, the processing module 610 can be configured to:

establish a transport bearer between the base station and the data request device and/or a transport bearer between the base station and the target local cache device, where the transport bearer is used to transmit data that is between the data request device and the target local cache device.

Optionally, the base station can further include:

a receiving module 630, configured to receive a second service data request that is sent by the data request device after establishing a network connection to the target local cache device and that is specific to the target local cache device, where the second service data request carries a target service data identifier; and the processing module 610 is further configured to send, when determining that the target local cache device has cached target service data corresponding to the target service data identifier, the cached target service data to the data request device.

Optionally, the processing module 610 can be configured to:

send the second service data request to the target local cache device;

receive the cached target service data that is sent by the target local cache device when detecting that the target service data has been cached; and send the cached target service data to the data request device.

Optionally, the processing module 610 can be further configured to:

when determining that the target local cache device has not cached the target service data, send a third service data request to the target data server, where the third service data request carries the target service data identifier, and the third service data request is used to instruct the target data server to send the target service data to the data request device.

Optionally, the processing module 610 can be configured to:

send the second service data request to the target local cache device, where the second service data request is used to instruct the target local cache device to send, when detecting that the target service data has not been cached, information indicating non-cached specific to the target service data to the base station; and receive the information indicating non-cached that is sent by the target local cache device and that is specific to the target service data, and determine that the target local cache device has not cached the target service data.

In the embodiment shown in FIG. 6, after detecting the first request message specific to the target data server, the data request device determines, based on the pre-received local cache device list sent by the base station, the target local cache device that is authorized to cache the service data of the target data server, and establishes the network connection to the target local cache device, so that the data request device can directly request the target service data from a local cache device in proximity. This avoids a waste of transmission overheads and a relatively large transmission delay that are caused by requesting data from the target data server, and therefore, a response speed of the data request device after the data request is increased, and user experience is improved.

Figure 7:
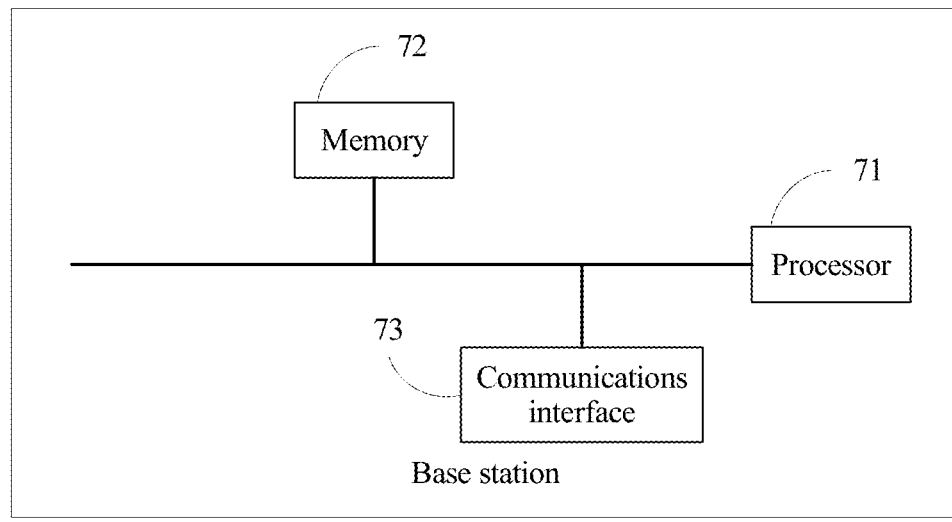
FIG. 7 is a schematic structural diagram of another base station according to an embodiment of the present disclosure.

FIG. 7 is a schematic structural diagram of another base station according to an embodiment of the present disclosure. As shown in FIG. 7, the base station includes a processor 71, a memory 72, and a communications interface 73. The processor 71 is connected to the memory 72 and the communications interface 73. For example, the processor 71 may be connected to the memory 72 and the communications interface 73 by using a bus.

The processor 71 is configured to support the base station in performing a corresponding function in the foregoing methods. The processor 71 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

The memory 72 is configured to store a local cache device list, program code, and the like. The memory 72 may include a volatile memory, for example, a random access memory (RAM); the memory 72 may also include a nonvolatile memory, for example, a read-only memory ROM), a flash memory, a hard disk drive HDD, or a solid-state drive (SSD); the memory 72 may further include a combination of memories of the foregoing types.

The communications interface 73 is configured to communicate with a data request device and/or a target local cache device to receive and send messages used in the foregoing method.

The processor 71 may invoke the program code to perform the following operations:

sending, by using the communications interface 73, a local cache device list to a data request device managed by the base station, where the local cache device list includes an identifier of at least one local cache device, and the local cache device list is used by the data request device to determine a target local cache device that is authorized to cache service data of the target data server.

Optionally, the processor 71 is further configured to:

receive, by using the communications interface 73, a second request message sent by the data request device, where the second request message carries routing information, the routing information is used to indicate the target local cache device; and establish a connection between the data request device and the target local cache device based on the second request message.

Optionally, when establishing the connection between the data request device and the target local cache device based on the second request message, the processor 71 can be configured to:

establish a transport bearer between the base station and the data request device and/or a transport bearer between the base station and the target local cache device, where the transport bearer is used to transmit data that is between the data request device and the target local cache device.

Optionally, the processor 71 can be further configured to:

receive, by using the communications interface 73, a second service data request that is sent by the data request device after establishing a network connection to the target local cache device and that is specific to the target local cache device, where the second service data request carries a target service data identifier; and send, when determining that the target local cache device has cached target service data corresponding to the target service data identifier, the cached target service data to the data request device by using the communications interface 73.

Optionally, when determining that the target local cache device has cached the target service data requested by the target service data request, and sending the cached target service data to the data request device by using the communications interface 73, the processor 71 can be configured to:

send the second service data request to the target local cache device by using the communications interface 73; receive, by using the communications interface 73, the cached target service data that is sent by the target local cache device when detecting that the target service data has been cached; and send the cached target service data to the data request device by using the communications interface 73.

Optionally, after receiving, by using the communications interface 73, the second service data request that is sent by the data request device after establishing the network connection to the target local cache device and that is specific to the target local cache device, the processor can be further configured to:

when determining that the target local cache device has not cached the target service data, send a third service data request to the target data server by using the communications interface 73, where the third service data request carries the target service data identifier, and the third service data request is used to instruct the target data server to send the target service data to the data request device.

Optionally, when determining that the target local cache device has not cached the target service data, the processor 71 can be configured to:

send the second service data request to the target local cache device by using the communications interface 73, where the second service data request is used to instruct the target local cache device to send, when detecting that the target service data has not been cached, information indicating non-cached specific to the target service data to the base station; and receive, by using the communications interface 73, the information indicating non-cached that is sent by the target local cache device and that is specific to the target service data, and determine that the target local cache device has not cached the target service data.

Figure 8:
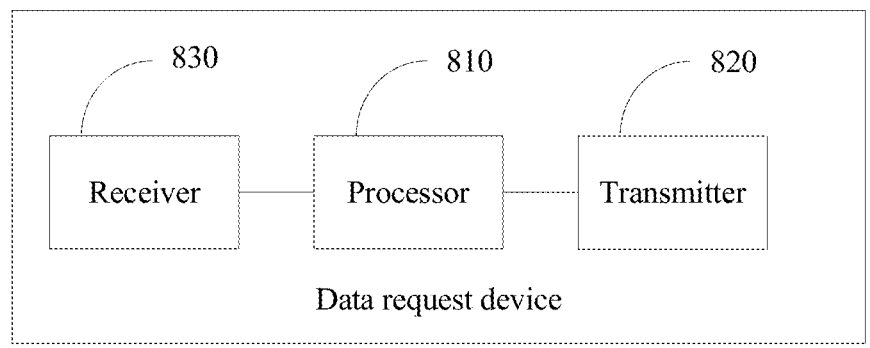
FIG. 8 is a schematic structural diagram of still another data request device according to an embodiment of the present disclosure.

FIG. 8 is a schematic structural diagram of another data request device according to an embodiment of the present disclosure. As shown in FIG. 8, the device includes:

a processor 810, configured to: detect a first request message specific to a target data server; determine, based on a pre-received local cache device list sent by a base station, a target local cache device used to cache service data of the target data server; and establish a network connection to the target local cache device; and a transmitter 820, configured to send a service data request specific to the target data server to the target local cache device by using the network connection.

Optionally, the processor 810 can be further configured to detect a first service data request whose target address is an address of the target data server, where the first service data request carries a target service data identifier; and the transmitter 820 is further configured to send a second service data request to the target local cache device, where the second service data request carries the target service data identifier, and the second service data request is used to instruct the target local cache device to send, when detecting that target service data corresponding to the target service data identifier has been cached, the cached target service data to the data request device; and the device further includes:

a receiver 830, configured to receive the target service data sent by the target local cache device.

Optionally, the first request message can include a target service data identifier, and is used to request target service data corresponding to the target service data identifier; and the transmitter 820 is further configured to send a second service data request to the target local cache device, where the second service data request carries the target service data identifier, and the second service data request is used to instruct the target local cache device to send, when detecting that the target service data corresponding to the target service data identifier has been cached, the cached target service data to the data request device; and the device further includes:

a receiver 830, configured to receive the target service data sent by the target local cache device.

Optionally, the local cache device list can include an identifier of at least one local cache device; and the processor 810 is configured to:

determine whether a first identifier consistent with an identifier of a local cache device in the local cache device list exists in a pre-obtained cache content authorization list, where the cache content authorization list includes an identifier of at least one local cache device that is authorized by the target data server to perform caching; and if the first identifier exists in the cache content authorization list, determine that a local cache device corresponding to the first identifier is the target local cache device.

Optionally, the receiver 830 can be further configured to:

receive the cache content authorization list sent by the target data server.

Optionally, the local cache device includes a base station to which the data request device belongs and/or at least one first cache device connected to the base station.

Optionally, the processor 810 can be configured to:

send a second request message to a base station to which the data request device belongs, where the second request message carries routing information, the routing information is used to indicate the target local cache device, and the second request message is used to instruct the base station to establish the connection between the data request device and the target local cache device.

Optionally, the routing information can include an identifier of the target local cache device or an index of the target local cache device.

Optionally, the processor 810 can be configured to:

receive a first service data request that is sent by user equipment and whose target address is the address of the target data server.

In the embodiment shown in FIG. 8, after detecting the first request message specific to the target data server, the data request device determines, based on the pre-received local cache device list sent by the base station, the target local cache device that is authorized to cache the service data of the target data server, and establishes the network connection to the target local cache device, so that the data request device can directly request the target service data from a local cache device in proximity. This avoids a waste of transmission overheads and a relatively large transmission delay that are caused by requesting data from the target data server, and therefore, a response speed of the data request device after the data request is increased, and user experience is improved.

Figure 9:
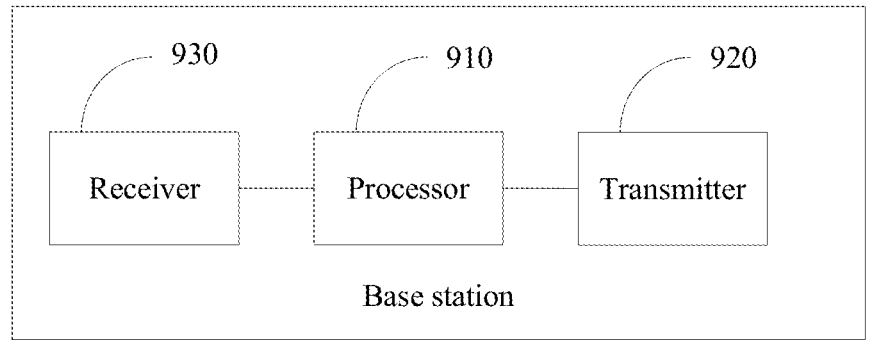
FIG. 9 is a schematic structural diagram of still another base station according to an embodiment of the present disclosure.

FIG. 9 is a schematic structural diagram of another base station according to an embodiment of the present disclosure. As shown in FIG. 9, the base station includes:

a processor 910, configured to obtain a local cache device list, where the local cache device list includes an identifier of at least one local cache device; and a transmitter 920, configured to send the local cache device list to a data request device managed by the base station, where the local cache device list is used by the data request device to determine a target local cache device used to cache service data of the target data server.

Optionally, the base station can further include:

a receiver 930, configured to receive a second request message sent by the data request device, where the second request message carries routing information, and the routing information is used to indicate the target local cache device; and the processor 910 is further configured to establish a connection or a bearer between the data request device and the target local cache device based on the second request message.

Optionally, the processor 910 can be configured to:

establish a transport bearer between the base station and the data request device and/or a transport bearer between the base station and the target local cache device, where the transport bearer is used to transmit data that is between the data request device and the target local cache device.

Optionally, the base station can further include:

a receiver 930, configured to receive a second service data request that is sent by the data request device after establishing a network connection to the target local cache device and that is specific to the target local cache device, where the second service data request carries a target service data identifier; and the processor 910 is further configured to send, when determining that the target local cache device has cached target service data corresponding to the target service data identifier, the cached target service data to the data request device.

Optionally, the processor 910 can be configured to:

send the second service data request to the target local cache device;

receive the cached target service data that is sent by the target local cache device when detecting that the target service data has been cached; and send the cached target service data to the data request device.

Optionally, the processor 910 can be further configured to:

when determining that the target local cache device has not cached the target service data, send a third service data request to the target data server, where the third service data request carries the target service data identifier, and the third service data request is used to instruct the target data server to send the target service data to the data request device.

Optionally, the processor 910 can be configured to:

send the second service data request to the target local cache device, where the second service data request is used to instruct the target local cache device to send, when detecting that the target service data has not been cached, information indicating non-cached specific to the target service data to the base station; and receive the information indicating non-cached that is sent by the target local cache device and that is specific to the target service data, and determine that the target local cache device has not cached the target service data.

In the embodiment shown in FIG. 9, after detecting the first request message specific to the target data server, the data request device determines, based on the pre-received local cache device list sent by the base station, the target local cache device that is authorized to cache the service data of the target data server, and establishes the network connection to the target local cache device, so that the data request device can directly request the target service data from a local cache device in proximity. This avoids a waste of transmission overheads and a relatively large transmission delay that are caused by requesting data from the target data server, and therefore, a response speed of the data request device after the data request is increased, and user experience is improved.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include: a magnetic disc, an optical disc, a read-only memory (ROM), or a random access memory (RAM).

What is disclosed above is merely example embodiments of the present disclosure, and is not intended to limit the protection scope of the present disclosure. Therefore, equivalent variations made in accordance with the claims of the present disclosure shall fall within the scope of the present disclosure.

What is claimed is:

1. A cache data request method, comprising:
   detecting, by a data request device, a first request message specific to a target data server;
   determining, by the data request device based on a pre-received local cache device list sent by a base station, a target local cache device used to cache service data of the target data server; and
   establishing, by the data request device, a network connection to the target local cache device, and sending a service data request specific to the target data server to the target local cache device by using the network connection, wherein after the establishing, by the data request device, the network connection to the target local cache device: detecting, by the data request device, a first service data request whose target address is an address of the target data server, wherein the first service data request carries a target service data identifier; and sending, by the data request device, a second service data request to the base station that sends the second service data request to the target local cache device, wherein the second service data request carries the target service data identifier, and the second service data request is used to instruct the target local cache device to send, when detecting that target service data corresponding to the target service data identifier has been cached, the cached target service data to the data request device; and receiving, by the data request device, the target service data sent by the target local cache device.

2. The method according to claim 1, wherein the first request message comprises a target service data identifier, and the first message requests target service data corresponding to the target service data identifier; and
   after the establishing, by the data request device, the network connection to the target local cache device, the method further comprises:
   sending, by the data request device, a second service data request to the target local cache device, wherein the second service data request carries the target service data identifier, and the second service data request is used to instruct the target local cache device to send, when detecting that the target service data corresponding to the target service data identifier has been cached, the cached target service data to the data request device; and receiving, by the data request device, the target service data sent by the target local cache device.

3. The method according to claim 1, wherein the local cache device list comprises an identifier of at least one local cache device; and
the determining, by the data request device based on a pre-obtained local cache device list, the target local cache device used to cache service data of the target data server comprises:
determining, by the data request device, whether a first identifier consistent with an identifier of a local cache device in the local cache device list exists in a pre-obtained cache content authorization list, wherein the cache content authorization list comprises an identifier of at least one local cache device that is authorized by the target data server to perform caching; and
in response to the first identifier being in the cache content authorization list, determining, by the data request device, that a local cache device corresponding to the first identifier is the target local cache device.

4. A data request device, comprising:
a processor, configured to: detect a first request message specific to a target data server; determine, based on a pre-received local cache device list sent by a base station, a target local cache device used to cache service data of the target data server; and establish a network connection to the target local cache device; and detect a first service data request whose target address is an address of the target data server, wherein the first service data request carries a target service data identifier; and
a transmitter, configured to: send a service data request specific to the target data server to the target local cache device by using the network connection including sending a second service data request to the base station that sends the second service data request to the target local cache device, wherein the second service data request carries the target service data identifier, and the second service data request is used to instruct the target local cache device to send, when detecting that target service data corresponding to the target service data identifier has been cached, the cached target service data to the data request device; and
a receiver, configured to receive the target service data sent by the target local cache device.

5. The device according to claim 4, wherein the first request message comprises a target service data identifier, and is used to request target service data corresponding to the target service data identifier; and
the transmitter is further configured to send a second service data request to the target local cache device, wherein the second service data request carries the target service data identifier, and the second service data request is used to instruct the target local cache device to send, when detecting that the target service data corresponding to the target service data identifier has been cached, the cached target service data to the data request device; and
the device further comprises:
a receiver, configured to receive the target service data sent by the target local cache device.

6. The device according to claim 4, wherein the local cache device list comprises an identifier of at least one local cache device; and
the processor is configured to:
determine whether a first identifier consistent with an identifier of a local cache device in the local cache device list exists in a pre-obtained cache content authorization list, wherein the cache content authorization list comprises an identifier of at least one local cache device that is authorized by the target data server to perform caching; and
in response to the first identifier being in the cache content authorization list, determine that a local cache device corresponding to the first identifier is the target local cache device.

7. The device according to claim 6, wherein the receiver is further configured to:
receive the cache content authorization list sent by the target data server.

8. The device according to claim 6, wherein the local cache device comprises a base station to which the data request device belongs and/or at least one first cache device connected to the base station.

9. The device according to claim 4, wherein the transmitter is configured to:
send a second request message to a base station to which the data request device belongs, wherein the second request message carries routing information, the routing information is used to indicate the target local cache device, and the second request message is used to instruct the base station to establish the connection or a bearer between the data request device and the target local cache device.

10. The device according to claim 9, wherein the routing information comprises an identifier of the target local cache device or an index of the target local cache device.

11. The device according to claim 4, wherein the processor is configured to:
receive a first service data request that is sent by user equipment and whose target address is the address of the target data server.

12. A base station, comprising:
a processor, configured to obtain a local cache device list, wherein the local cache device list comprises an identifier of at least one local cache device; and
a transmitter, configured to send the local cache device list to a data request device managed by the base station, wherein the local cache device list is used by the data request device to determine a target local cache device used to cache service data of the target data server; and
a receiver, configured to receive a second request message sent by the data request device, wherein the second request message carries routing information, and the routing information is used to indicate the target local cache device, wherein, the processor is further configured to establish a connection or a bearer between the data request device and the target local cache device based on the second request message wherein the processor is configured to: establish a transport bearer between the base station and the data request device and/or a transport bearer between the base station and the target local cache device, wherein the transport bearer is used to transmit data that is between the data request device and the target local cache device.

13. The base station according to claim 12, wherein the base station further comprises:
a receiver, configured to receive a second service data request that is sent by the data request device after establishing a network connection to the target local cache device and that is specific to the target local cache device, wherein the second service data request carries a target service data identifier; and the processor is further configured to send, when determining that the target local cache device has cached target service data corresponding to the target service data identifier, the cached target service data to the data request device.

14. The base station according to claim 13, wherein the processor is configured to:
send the second service data request to the target local cache device;
receive the cached target service data that is sent by the target local cache device when detecting that the target service data has been cached; and
send the cached target service data to the data request device.

15. The base station according to claim 13, wherein the transmitter is further configured to:
when determining that the target local cache device has not cached the target service data, send a third service data request to the target data server, wherein the third service data request carries the target service data identifier, and the third service data request is used to instruct the target data server to send the target service data to the data request device.

16. The base station according to claim 15, wherein the processor is configured to:
send the second service data request to the target local cache device, wherein the second service data request is used to instruct the target local cache device to send, when detecting that the target service data has not been cached, information indicating non-cached specific to the target service data to the base station; and
receive the information indicating non-cached that is sent by the target local cache device and that is specific to the target service data, and determine that the target local cache device has not cached the target service data.

* * * * *